US009826245B2

(12) United States Patent
Maeda et al.

(10) Patent No.: US 9,826,245 B2
(45) Date of Patent: Nov. 21, 2017

(54) METHOD, APPARATUS AND RECORDING MEDIUM FOR ENCODING/DECODING USING PARALLEL PROCESSING OF IMAGE TILES

(71) Applicant: CANON KABUSHIKI KAISHA, Tokyo (JP)

(72) Inventors: Mitsuru Maeda, Tokyo (JP); Koji Okawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 303 days.

(21) Appl. No.: 14/411,368

(22) PCT Filed: Jun. 26, 2013

(86) PCT No.: PCT/JP2013/004000
§ 371 (c)(1),
(2) Date: Dec. 24, 2014

(87) PCT Pub. No.: WO2014/002495
PCT Pub. Date: Jan. 3, 2014

(65) Prior Publication Data
US 2015/0172688 A1 Jun. 18, 2015

(30) Foreign Application Priority Data

Jun. 29, 2012 (JP) ................................. 2012-147142

(51) Int. Cl.
*H04N 7/26* (2006.01)
*H04N 19/70* (2014.01)
*H04N 19/174* (2014.01)
*H04N 19/44* (2014.01)
(Continued)

(52) U.S. Cl.
CPC .......... *H04N 19/436* (2014.11); *H04N 19/70* (2014.11)

(58) Field of Classification Search
None
See application file for complete search history.

(56) References Cited

U.S. PATENT DOCUMENTS

2002/0196970 A1* 12/2002 Sano ....................... G06T 9/007
382/166
2010/0226441 A1 9/2010 Tung et al.
(Continued)

OTHER PUBLICATIONS

Bross, High efficiency video coding (HEVC) text specification draft 6, Joint Collaborative Team on Video Coding (JCT-VC) of ITU-T SG16 WP3 and ISO/IEC JTC1/SC29/WG11 8th Meeting: San José, CA, USA, Feb. 1-10, 2012, JCTVC-H1003.*
(Continued)

*Primary Examiner* — Dave Czekaj
*Assistant Examiner* — Alison Slater
(74) *Attorney, Agent, or Firm* — Canon USA, Inc. I.P. Division

(57) ABSTRACT

An image encoding format includes a profile indicating a combination of processes which an image decoding apparatus is capable of decoding and a level indicating a range of a parameter which the image decoding apparatus is capable of decoding. The image decoding apparatus includes a decoding unit that decodes the image encoding format on the basis of a code that indicates whether parallel processing of the decoding processes in each tile is enabled depending on the profile.

8 Claims, 13 Drawing Sheets

(51) Int. Cl.
*H04N 19/46* (2014.01)
*H04N 19/436* (2014.01)

(56) References Cited

U.S. PATENT DOCUMENTS

| | | | |
|---|---|---|---|
| 2014/0003531 A1* | 1/2014 | Coban | H04N 19/70 375/240.24 |
| 2015/0023409 A1* | 1/2015 | Schierl | H04N 19/70 375/240.02 |

OTHER PUBLICATIONS

Clare et al., "Wavefront Parallel Processing for HEVC Encoding and Decoding", Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-16.

Worrall et al., "AHG8: Inclusion of Parallel Processing Schemes in the Main Profile", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, pp. 1-16.

Bross et al., "High efficiency video coding (HEVC) text specification draft 7", Joint Collaborative Team on Video Coding (JCT-VC) of ITU-T SG16 WP3 and ISO/IEC JTC1/SC29/WG11 9th Meeting: Geneva, CH, Apr. 27-May 7, 2012, pp. 67-70 7.4.2.3 Picture parameter set RBSP semantics.

ITU-T, Telecommunication Standardization Sector of ITU, Series H: Audiovisual and Multimedia Systems Infrastructure of audiovisual services—Coding of moving video, "Advanced video coding for generic audio visual services", H.264 (Mar. 2010), pp. 24-25 6.3 Spatial subdivision of pictures and slices.

Bross et al., "High efficiency video coding (HEVC) text specification draft 6", Joint Collaborative Team on Video Coding (JCT-VC) of ITU-T SG16 WP3 and ISO/IEC JTC1/SC29/WG11 8th Meeting: San Jose, CA, USA, Feb. 1-10, 2012.

Raulet et al., "Parallelism tools mandatory at a given profile/level", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012.

Fogg, et al., "Profiles & Levels: multicore, Max DPB, field sequences", Joint Collaborative Team on Video Coding (JCT-VC) of ITU-T SG16 WP3 and ISO/IEC JTC1/SC29/WG11, JCTVC-I0391, May 7, 2012.

* cited by examiner

[Fig. 1]
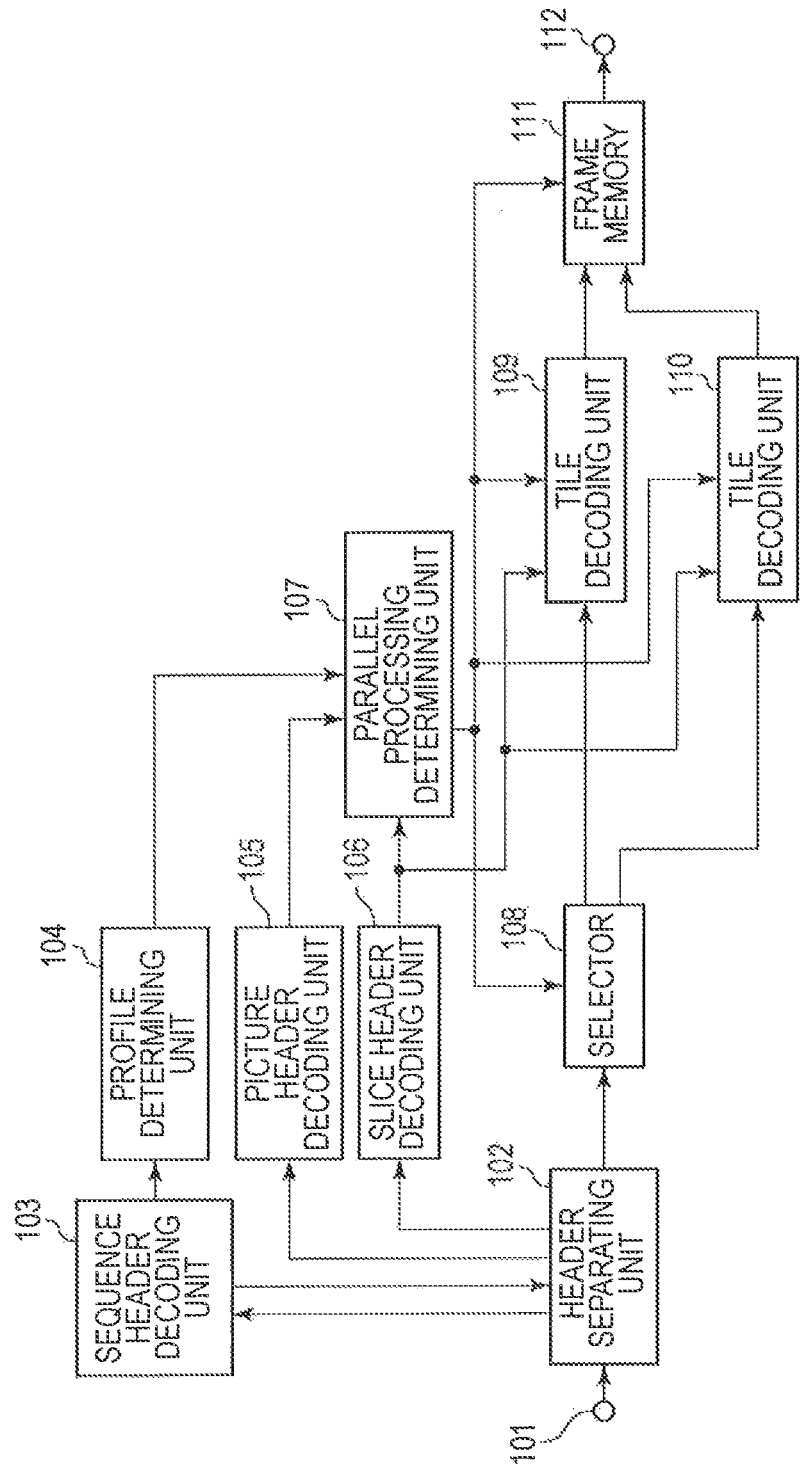

[Fig. 2]
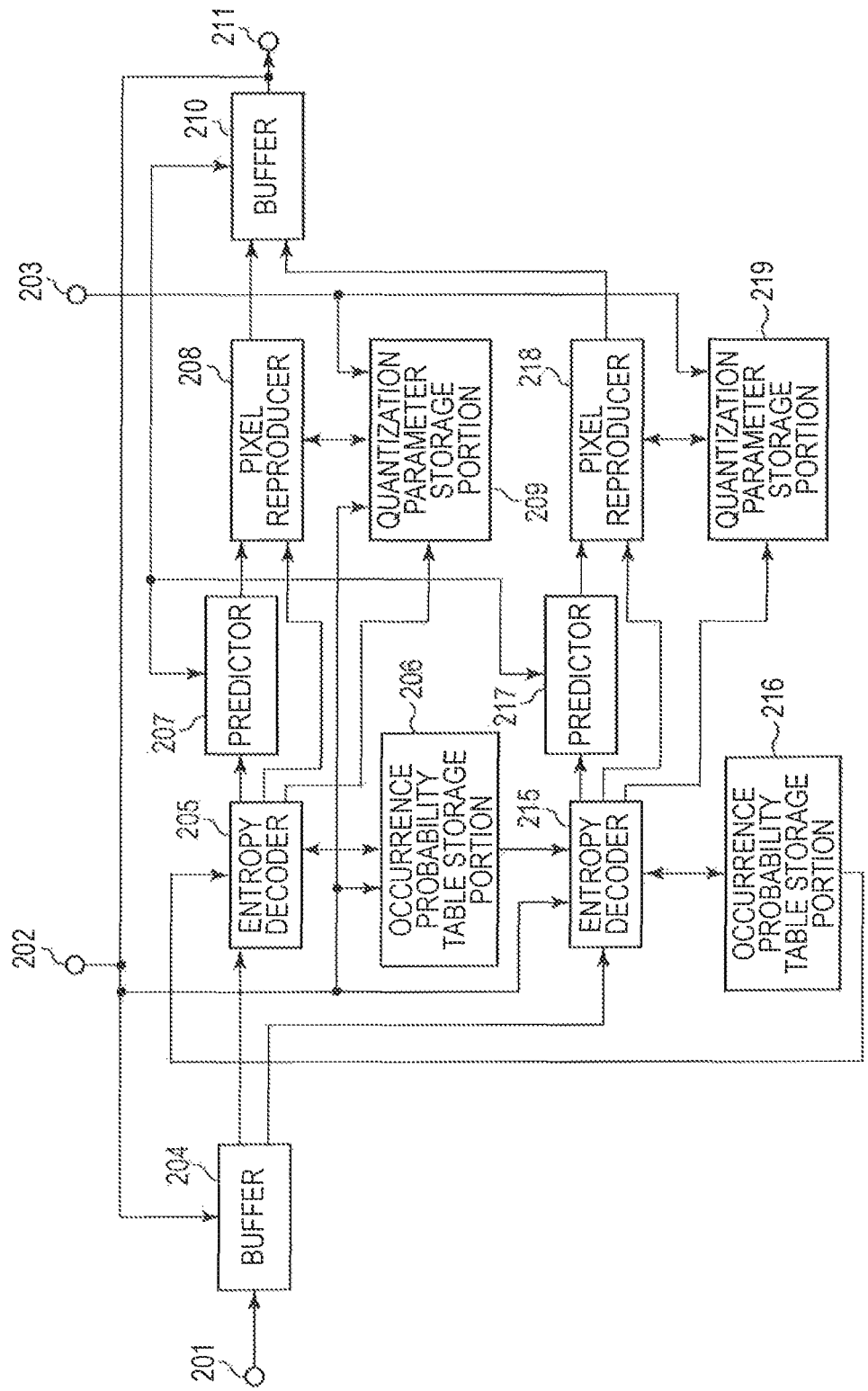

[Fig. 3A]
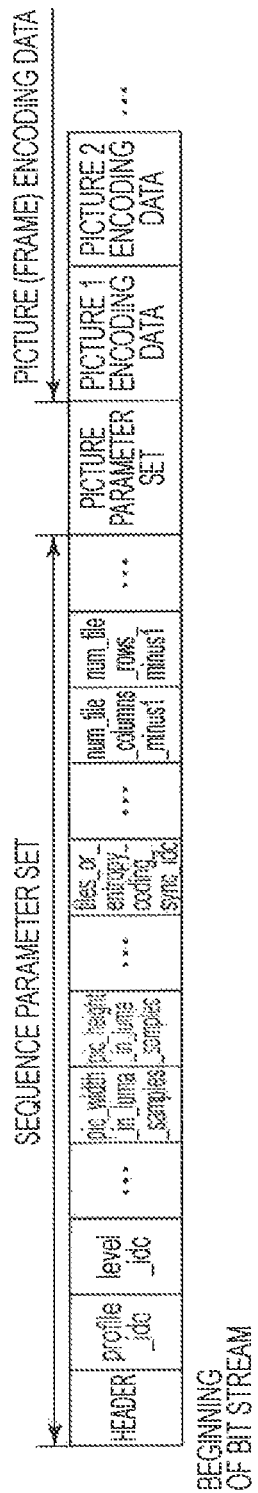

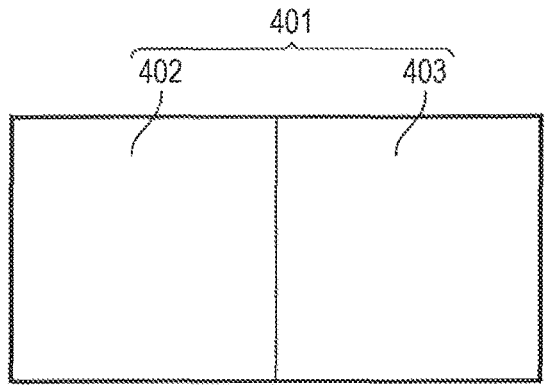

[Fig. 4B]

| (0,0) | (0,1) | (0,2) | (0,3) | | (0,26) | (0,27) | (0,28) | (0,29) |
|---|---|---|---|---|---|---|---|---|
| (1,0) | (1,1) | (1,2) | (1,3) | ...... | (1,26) | (1,27) | (1,28) | (1,29) |
| (2,0) | (2,1) | (2,2) | (2,3) | | (2,26) | (2,27) | (2,28) | (2,29) |
| ⋮ | | | | | | | | ⋮ |
| (31,0) | (31,1) | (31,2) | (31,3) | | (31,26) | (31,27) | (31,28) | (31,29) |
| (32,0) | (32,1) | (32,2) | (32,3) | ...... | (32,26) | (32,27) | (32,28) | (32,29) |
| (33,0) | (33,1) | (33,2) | (33,3) | | (33,26) | (33,27) | (33,28) | (33,29) |

[Fig. 5]
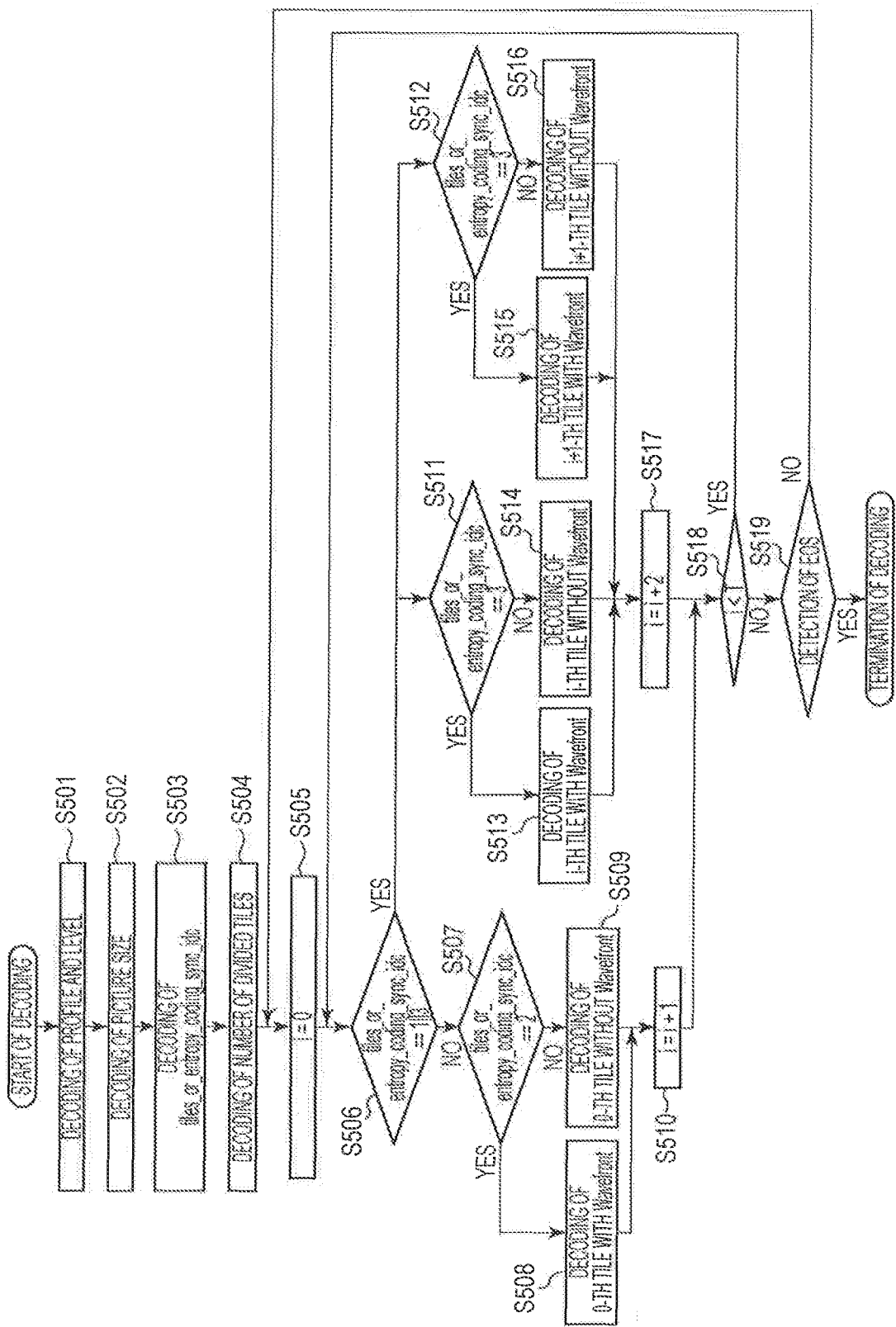

[Fig. 6]
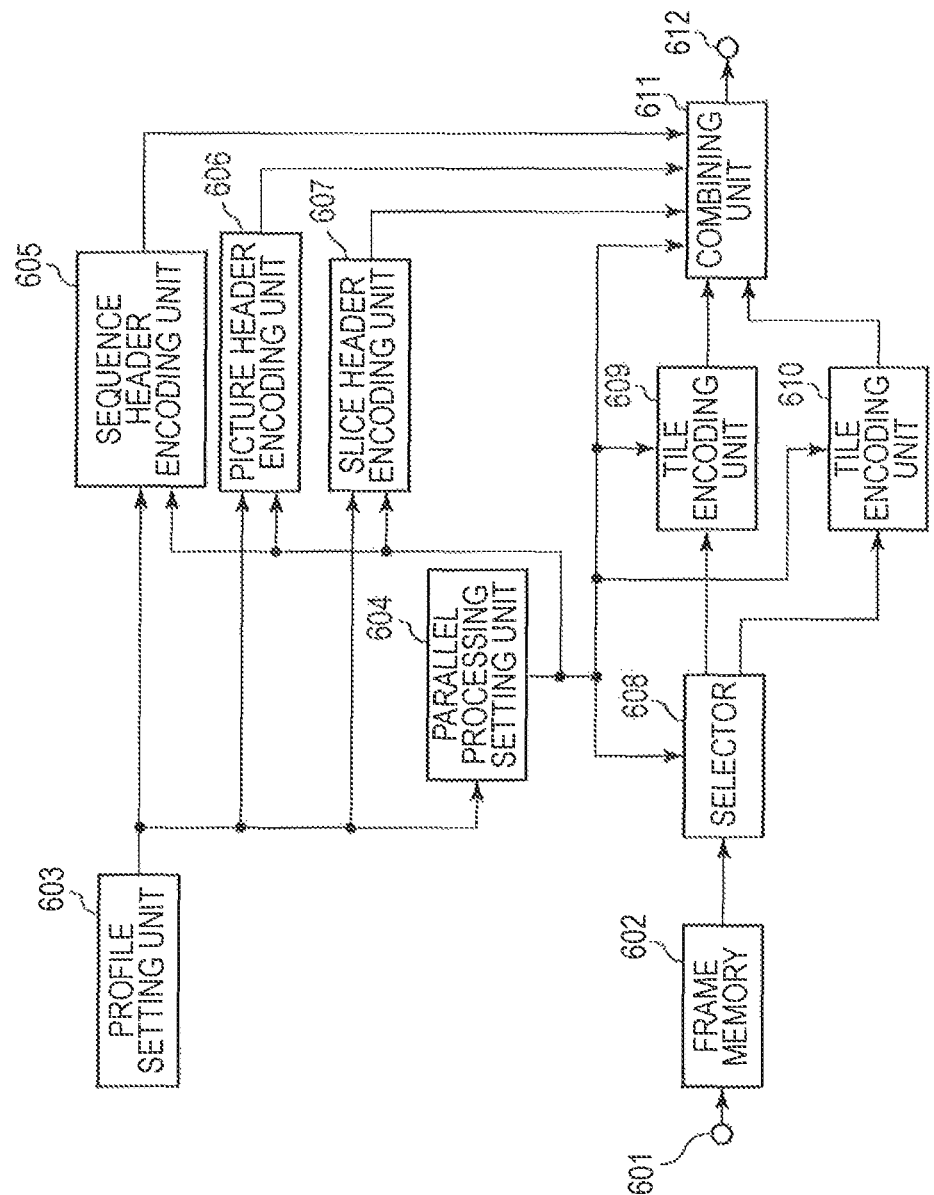

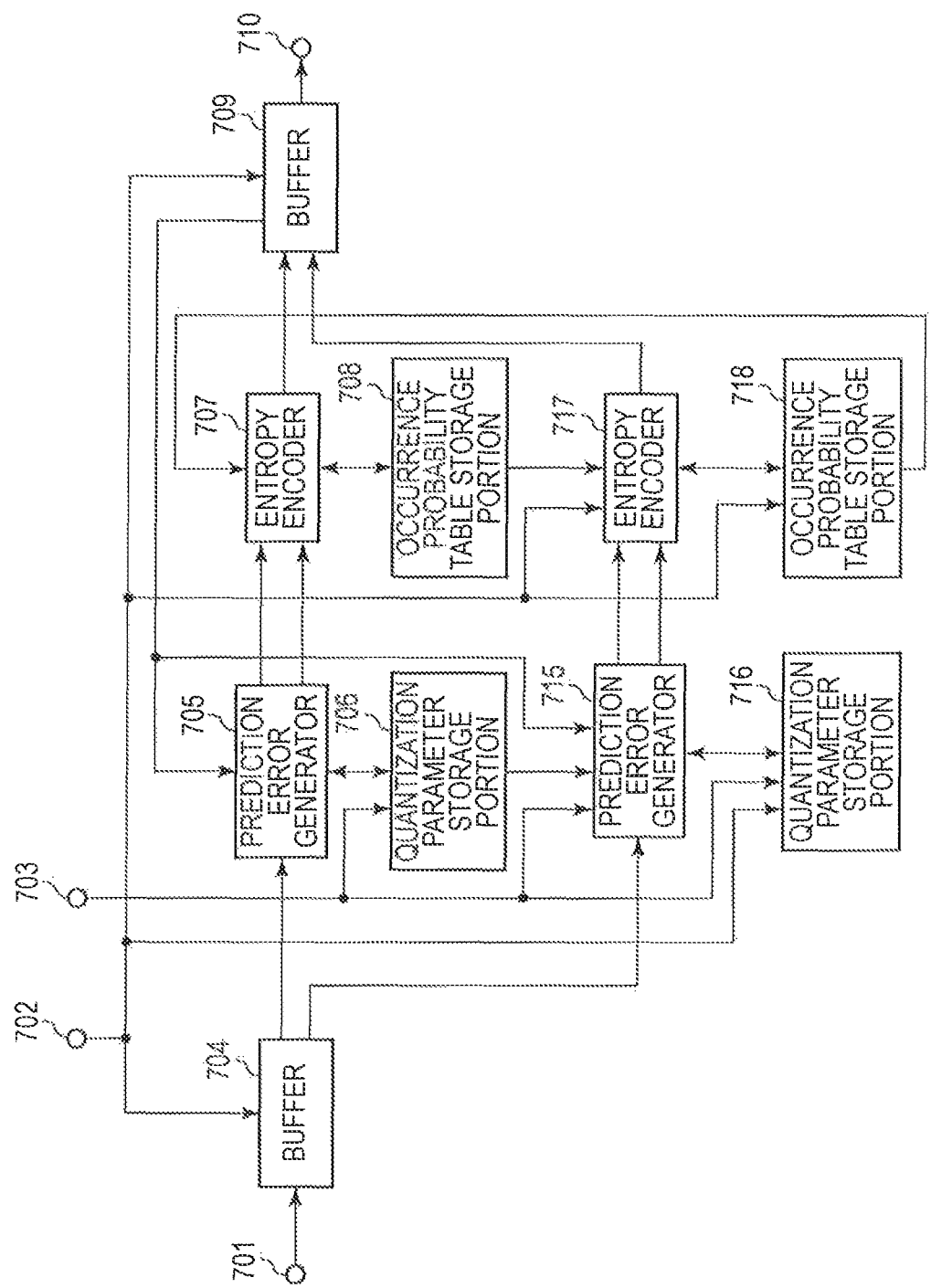
[Fig. 7]

[Fig. 8]
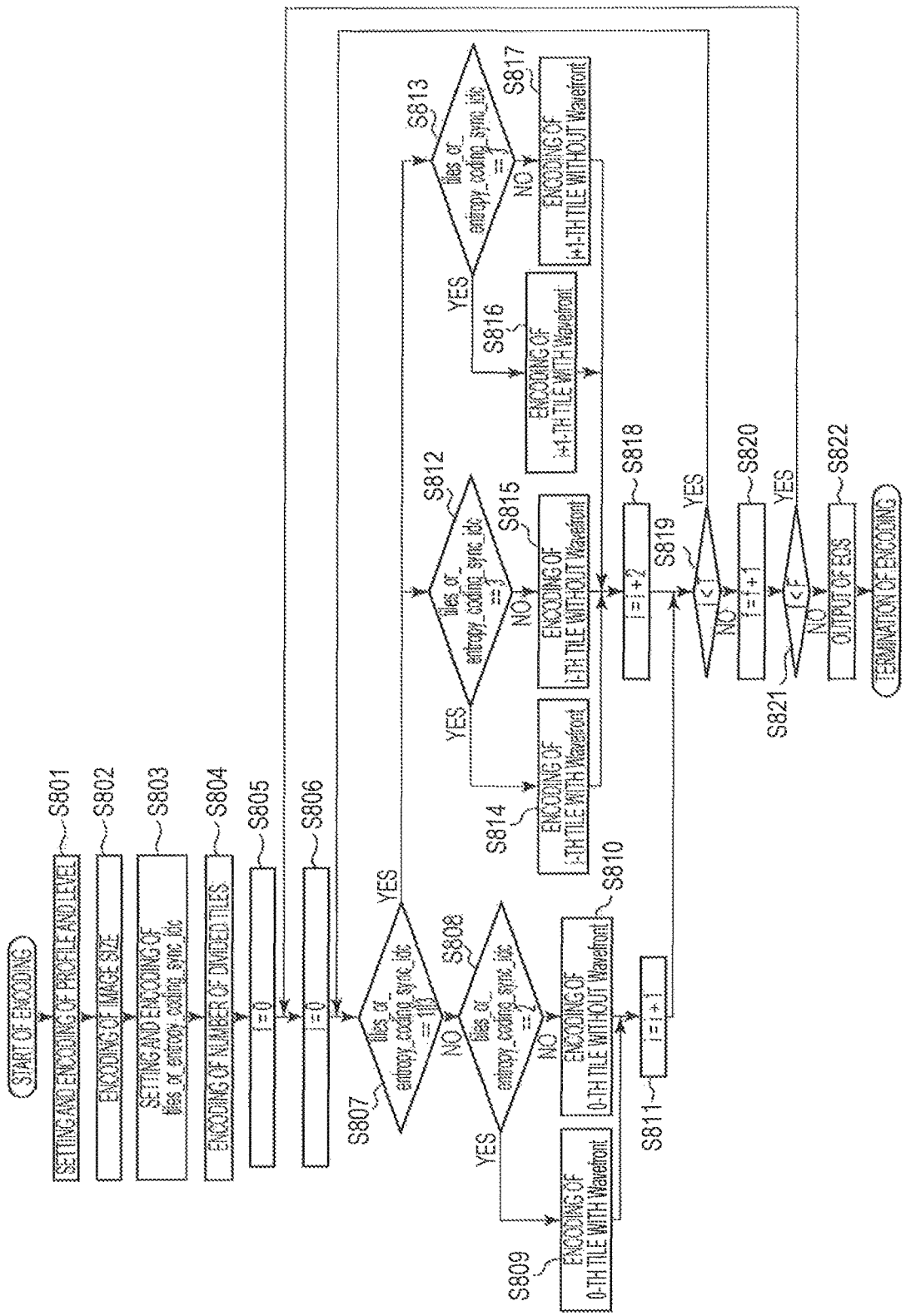

[Fig. 9]
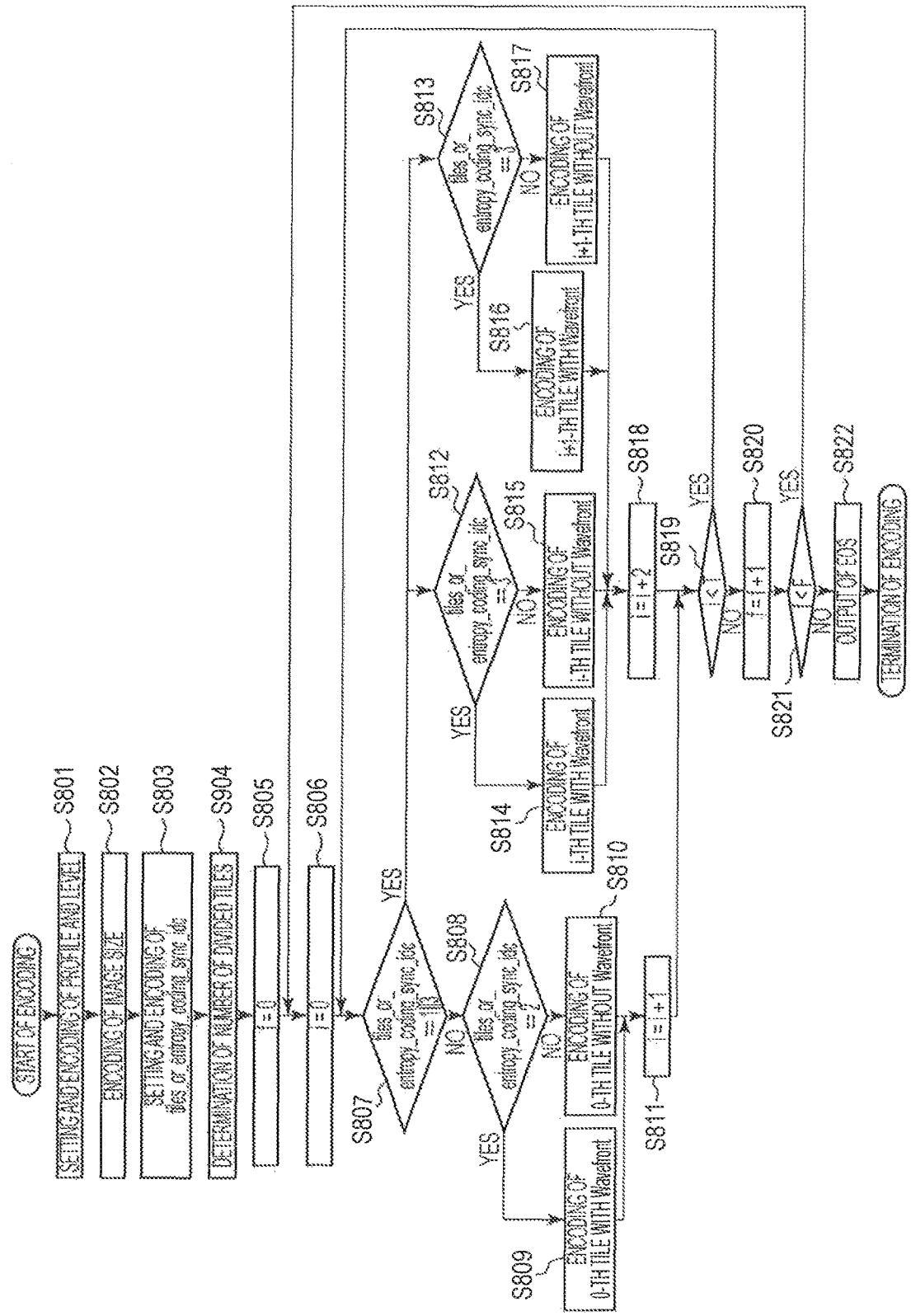

[Fig. 10]
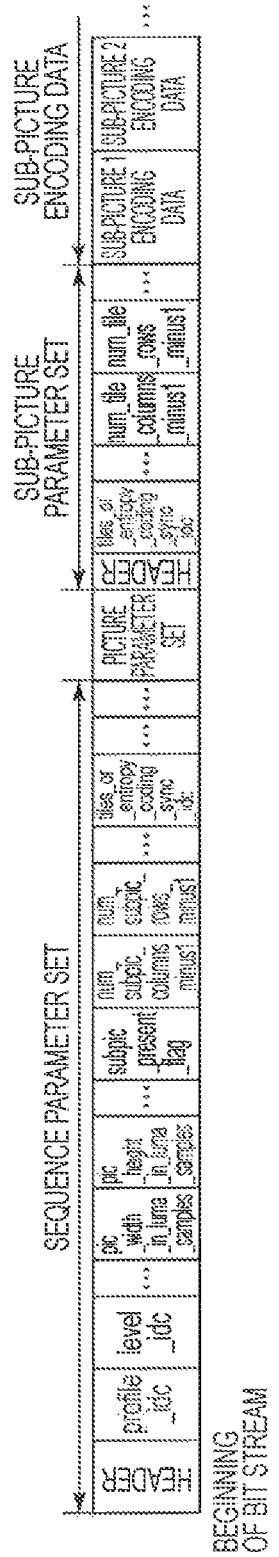

[Fig. 11]
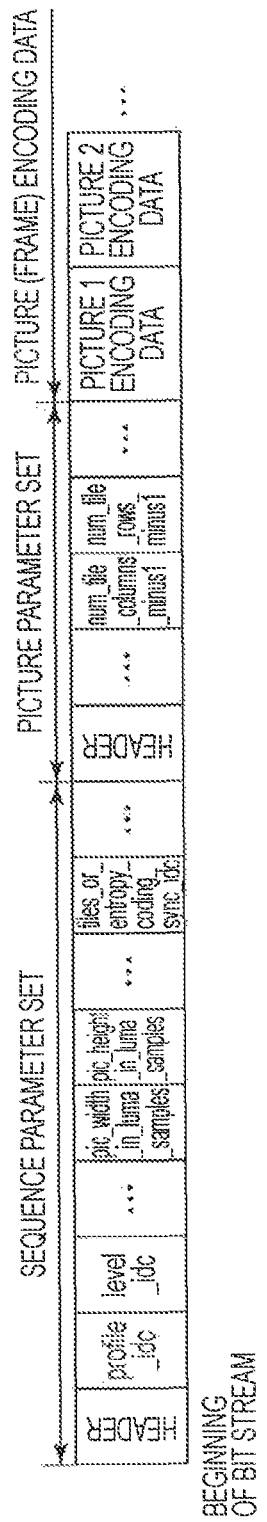

[Fig. 12]
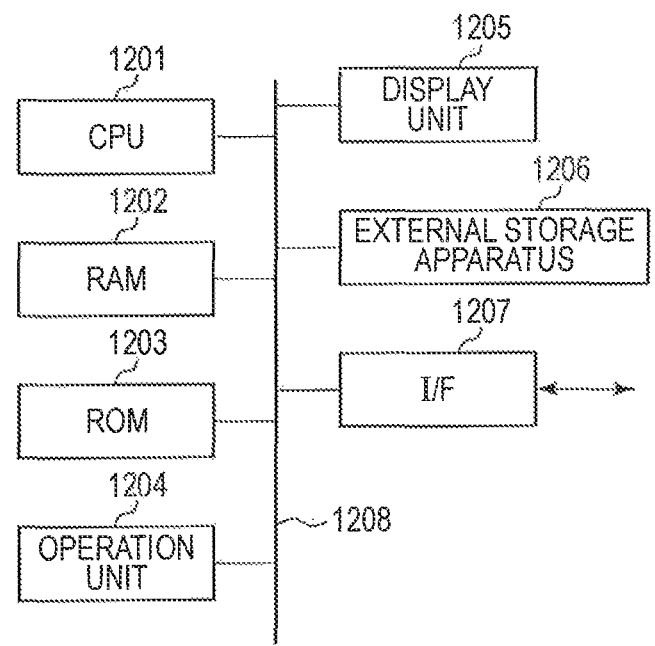

METHOD, APPARATUS AND RECORDING MEDIUM FOR ENCODING/DECODING USING PARALLEL PROCESSING OF IMAGE TILES

TECHNICAL FIELD

The present invention relates to an image encoding apparatus, an image encoding method, and a recording medium; and an image decoding apparatus, an image decoding method, and a recording medium. In particular, the present invention relates to methods of encoding and decoding an image in which each picture is divided into rectangular tiles by parallel processing.

BACKGROUND ART

H.264/MPEG-4 Advanced Video Coding (H.264/MPEG-4 AVC) (hereinafter referred to as H.264) is known as an encoding method used in compression recording of moving pictures (Refer to NPL 1). In H.264, a picture can be divided into multiple slices for encoding. Since low dependency of data exists between the slices, it is possible to execute an encoding process and a decoding process in parallel. The division into slices has a major advantage of executing the parallel processing by, for example, a multi-core central processing unit (CPU) to reduce the processing time.

Each slice is encoded by a binary arithmetic coding method in related art adopted in H.264. Specifically, each syntax element is binarized to generate a binary signal. Each syntax element has a table of occurrence probability (hereinafter referred to as an occurrence probability table) given thereto in advance and the binary signal is arithmetically encoded on the basis of the occurrence probability table. In decoding, the occurrence probability table is used as decoding information in the decoding of subsequent codes. In encoding, the occurrence probability table is used as encoding information in the encoding of subsequent codes. Each time the encoding is performed, the occurrence probability table is updated on the basis of statistical information indicating whether the encoded binary signal is a symbol having a higher occurrence probability.

Activities for international standardization of more efficient encoding methods, which are successors of H.264, have been started in recent years to establish Joint Collaborative Team on Video Coding (JCT-VC) between International Organization for Standardization (ISO)/International Electrotechnical Commission (IEC) and International Telecommunication Union Telecommunication Standardization sector (ITU-T). In JCT-VC, standardization of High Efficiency Video Coding method (hereinafter referred to as HEVC) is advanced.

In the standardization of HEVC, various encoding tools are widely reviewed in terms of not only the improvement of encoding efficiency but also the ease of mounting and the reduction in processing time. In order to achieve the reduction in processing time, methods of improving parallelism are also examined. The methods include a method called Wavefront for executing entropy encoding and entropy decoding in parallel (refer to NPL 2). Since a binary signal to be encoded is required to be encoded by using the occurrence probability table that is constantly updated, it is not possible to execute the processing in parallel without resetting of the statistical information. However, the resetting of the statistical information has a problem in that the encoding efficiency is reduced. In contrast, in Wavefront, the occurrence probability table at a time when the blocks at multiple predetermined positions are encoded is applied to a leftmost block on the next line to enable the parallel encoding process of the blocks for every line while suppressing the reduction in encoding efficiency. Although Wavefront is described with focus on the encoding process, the same applies to the decoding process.

In addition, tiling is also included in HEVC as a method of improving the parallelism. The tiling is a technology to divide a picture into rectangles to separately process the rectangles. This technology allows the speed-up of the parallel encoding-decoding to be realized and allows the memory capacities of an encoding apparatus and a decoding apparatus to be reduced.

In HEVC, a tiles_or_entropy_coding_sync_idc code has hitherto been used to exclusively perform the processing tasks, such as the tiling and Wavefront. When the tiles_or_entropy_coding_sync_idc code has a value of zero, the picture includes only one tile and the parallel processing such as Wavefront is not performed. When the tiles_or_entropy_coding_sync_idc code has a value of one, the picture includes multiple tiles but the parallel processing such as Wavefront is not performed. When the tiles_or_entropy_coding_sync_idc code has a value of two, the picture includes only one tile and the parallel processing such as Wavefront is performed. When the tiles_or_entropy_coding_sync_idc code has a value of three, the picture includes only one tile and entropy slice capable of being independently decoded is used without performing the parallel processing such as Wavefront. Values other than the above values are not capable of being used. This is because performing multiple processes in parallel when an image is sufficiently small, like a high-definition image, has a problem in that the control of the parallel processing is made complicated and the complexity is increased with respect to the picture size. Accordingly, the exclusive processing is performed in such a case. However, when a large screen such as a super high-definition screen is processed, it is necessary to divide the screen into segments each having a certain size, allocate the segments to nodes of a computer, and cause multiple processors to operate in the nodes. For example, when a tile is allocated to each node to perform the processing, there is a problem in that it is not possible to perform the parallel process, such as Wavefront or the entropy slice, in the tiles.

CITATION LIST

Non Patent Literature

NPL 1: ITU-T H.264 (March 2010) Advanced video coding for generic audio visual services
NPL 2: Contribution to JCT-VC JCTVC-I1003 a document in the Internet <http://phenix.int-evry.fr/jct/doc)

SUMMARY OF INVENTION

The present invention provides high-speed encoding-decoding processes that realize an encoding format capable of parallel processing in multiple stages to achieve high processing parallelism.

According to an exemplary embodiment, an image decoding apparatus decodes an image encoding format in which a picture is divided into a plurality of rectangular tiles that are encoded. The image encoding format includes a profile indicating a combination of processes which the image decoding apparatus is capable of decoding and a level indicating a range of a parameter which the image decoding apparatus is capable of decoding. The image decoding apparatus includes a decoding unit configured to decode the image encoding format on the basis of a code that indicates whether parallel processing of the decoding processes in each tile is enabled depending on the profile.

According to another exemplary embodiment, an image encoding apparatus includes an input unit configured to receive a picture; a first tile dividing unit configured to divide the picture into a plurality of rectangular tiles; a second tile dividing unit configured to divide the picture into tiles each having a size at which parallel processing is enabled; a first encoding unit configured to encode each tile to generate a code which is capable of being decoded by the parallel processing; a second encoding unit configured to encode each tile to generate a code capable of being sequentially decoded; and a control unit configured to select a first encoding method using the first and second tile dividing units and the first encoding unit or a second encoding method using the first and second tile dividing units and the second encoding unit for control.

According to the present invention, it is possible to realize high-speed encoding-decoding processes that realize an encoding format capable of parallel processing in multiple stages to achieve high processing parallelism.

BRIEF DESCRIPTION OF DRAWINGS

FIG. 1 is a block diagram illustrating an exemplary configuration of an image decoding apparatus according to a first embodiment.

FIG. 2 is a block diagram illustrating a detailed exemplary configuration of tile decoding units in the image decoding apparatus according to the first embodiment.

FIG. 3A illustrates an exemplary encoding format of image encoding data in the first and second embodiments.

FIG. 3B illustrates an exemplary encoding format of the image encoding data in a case in which a tiles_or_entropy_coding_sync_idc code has a value of zero in the first and second embodiments.

FIG. 3C illustrates an exemplary encoding format of the image encoding data in a case in which the tiles_or_entropy_coding_sync_idc code has a value of one in the first and second embodiments.

FIG. 3D illustrates an exemplary encoding format of the image encoding data in a case in which the tiles_or_entropy_coding_sync_idc code has a value of two in the first and second embodiments.

FIG. 3E illustrates an exemplary encoding format of the image encoding data in a case in which the tiles_or_entropy_coding_sync_idc code has a value of three in the first and second embodiments.

FIG. 4A illustrates an example of how a picture is divided into tiles.

FIG. 4B illustrates an example of how each tile is divided into blocks.

FIG. 5 is a flowchart illustrating an exemplary image decoding process of the image encoding data in the first embodiment.

FIG. 6 is a block diagram illustrating an exemplary configuration of an image encoding apparatus according to a second embodiment.

FIG. 7 is a block diagram illustrating a detailed exemplary configuration of tile encoding units in the image encoding apparatus according to the second embodiment.

FIG. 8 is a flowchart illustrating an exemplary image encoding process of the image encoding data in the second embodiment.

FIG. 9 is a flowchart illustrating another exemplary image encoding process of the image encoding data in the second embodiment.

FIG. 10 illustrates another exemplary encoding format of the image encoding data.

FIG. 11 illustrates another exemplary encoding format of the image encoding data.

FIG. 12 is a block diagram illustrating an exemplary hardware configuration of a computer applicable to the image encoding apparatus and the image decoding apparatus according to the embodiments.

DESCRIPTION OF EMBODIMENTS

Exemplary embodiments of the present invention will herein be described in detail with reference to the attached drawings. Configurations indicated in the exemplary embodiments are only examples and the present invention is not limited to the configurations illustrated in the exemplary embodiments.

First Exemplary Embodiment

A first exemplary embodiment of the present invention will now be described with reference to the drawings. FIG. 1 is a block diagram illustrating an exemplary configuration of an image decoding apparatus according to the first embodiment. Referring to FIG. 1, the image decoding apparatus includes a terminal 101, a header separating unit 102, a sequence header decoding unit 103, a profile determining unit 104, a picture header decoding unit 105, a slice header decoding unit 106, a parallel processing determining unit 107, a selector 108, a tile decoding unit 109, a tile decoding unit 110, a frame memory 111, and a terminal 112. The image decoding apparatus receives a bit stream with the terminal 101. The header separating unit 102 separates a header part and an encoding data part of encoded data from the bit stream that is received. The header part resulting from the separation is supplied to a block where each header is decoded. The data in the encoding data part is supplied to the selector 108. The sequence header decoding unit 103 decodes a sequence parameter set, which is the header of a sequence. The profile determining unit 104 determines profile information included in the sequence parameter set. The picture header decoding unit 105 decodes a picture header. The slice header decoding unit 106 decodes a slice header, which is the header of each slice. The parallel processing determining unit 107 determines parallel processing from the result in the profile determining unit 104 and the result in the slice header decoding unit 106. The selector 108 selects an output destination on the basis of the output from the parallel processing determining unit 107. The tile decoding unit 109 and the tile decoding unit 110 perform the decoding for every tile. The frame memory 111 stores image data resulting from the decoding. The image decoding apparatus externally outputs a decoded image from the terminal 112.

A decoding operation of a bit stream in the image decoding apparatus will now be described. FIG. 3A illustrates an example of the bit stream to be decoded. An example in which the bit stream is decoded in the image decoding apparatus illustrated in FIG. 1 will be described here. In the present embodiment, the bit stream in which a picture is divided into multiple rectangular tiles and the Wavefront processing described above is capable of being performed in each tile is received.

The bit stream received with the terminal 101 is supplied to the header separating unit 102. The header separating unit 102 separates a sequence parameter set in FIG. 3A and supplies the sequence parameter set to the sequence header decoding unit 103. The sequence header decoding unit 103 decodes a profile_idc code subsequently to a header in FIG. 3A to reproduce the profile information. Then, the sequence header decoding unit 103 decodes a level_idc code to reproduce level information. A main profile and a parallel profile are exemplified here. The level is defined by the range of the size of a picture to be processed. However, the name, etc. are not limited to this. The multiple parallel processing tasks do not exist in the main profile, as in the related art. In contrast, the Wavefront processing can be performed in each tile in the parallel profile.

Then, the sequence header decoding unit 103 reads a pic_width_in_luma_samples code and a pic_height_in_luma_samples code, which indicate the size of the picture. The sequence header decoding unit 103 decodes the pic_width_in_luma_samples code and the pic_height_in_luma_samples code to reproduce the size of the picture in order to, for example, ensure the capacity of the downstream memory. Then, the sequence header decoding unit 103 receives the tiles_or_entropy_coding_sync_idc code. Table 1 indicates the content of the tiles_or_entropy_coding_sync_idc code.

TABLE 1

| Value of tiles_or_entropy_coding_sync_idc code | Meaning |
|---|---|
| 0 | Only one tile exists in one picture and Wavefront processing is not performed |
| 1 | Although multiple tiles exist in one picture, Wavefront processing is not performed |
| 2 | Only one tile exists in one picture and Wavefront processing is performed |
| 3 | Multiple tiles exist in one picture and Wavefront processing is performed in each tile |

Table 1 indicates that the tiles_or_entropy_coding_sync_idc code has a value of any of zero to two in the main profile while the tiles_or_entropy_coding_sync_idc code has a value of any of zero to three in the parallel profile.

The profile determining unit 104 receives the profile information that is decoded to determine whether the parallel profile in which the Wavefront processing, which is the parallel processing, is can be performed in the multiple tiles resulting from the division is used. The profile determining unit 104 supplies the result of the determination and the value of the tiles_or_entropy_coding_sync_idc code to the parallel processing determining unit 107. It is assumed here that the signal supplied from the profile determining unit 104 represents zero in the main profile and represents one in the parallel profile.

The parallel processing determining unit 107 sets the tile decoding unit 109 as the output destination from the selector 108 regardless of the profile if the tiles_or_entropy_coding_sync_idc code has a value of zero. In this case, the tile decoding unit 110 is caused not to operate. The fact that the Wavefront processing is not performed is also supplied to the tile decoding unit 109.

The parallel processing determining unit 107 sets the tile decoding unit 109 and the tile decoding unit 110 as the output destinations from the selector 108 regardless of the profile if the tiles_or_entropy_coding_sync_idc code has a value of one. The fact that the Wavefront processing is not performed is also supplied to the tile decoding unit 109. The parallel processing determining unit 107 sets the tile decoding unit 109 as the output destination from the selector 108 regardless of the profile if the tiles_or_entropy_coding_sync_idc code has a value of two. The fact that the Wavefront processing is performed is also supplied to the tile decoding unit 109. In this case, the tile decoding unit 110 is caused not to operate.

The parallel processing determining unit 107 sets the tile decoding unit 109 and the tile decoding unit 110 as the output destinations from the selector 108 only in the parallel profile if the tiles_or_entropy_coding_sync_idc code has a value of three. The fact that the Wavefront processing is performed is also supplied to the tile decoding unit 109 and the tile decoding unit 110. Since the tiles_or_entropy_coding_sync_idc code has a value of any of zero to two in the main profile, the bit stream does not conform to the standard if the tiles_or_entropy_coding_sync_idc code has a value of three.

The profile determining unit 104 supplies the value of the tiles_or_entropy_coding_sync_idc code to the parallel processing determining unit 107. Necessary information in the result of the decoding other than the value of the tiles_or_entropy_coding_sync_idc code is supplied to each block. Each block uses the supplied information to perform initialization.

The header separating unit 102 separates a picture parameter set in FIG. 3A and supplies the picture parameter set to the picture header decoding unit 105 for decoding. Necessary information in the result of the decoding is supplied to each block. Then, the image decoding apparatus receives encoded data about each picture in FIG. 3A. The header separating unit 102 separates the slice header from the encoded data about each picture and supplies the slice header to the slice header decoding unit 106. The slice header decoding unit 106 decodes information concerning encoded data about each tile and encoded data about a block line where the Wavefront processing is performed and supplies the information to the parallel processing determining unit 107. In addition, the slice header decoding unit 106 supplies the result of the decoding concerning a quantization parameter included in the slice header to downstream units.

The parallel processing determining unit 107 determines the value of the tiles_or_entropy_coding_sync_idc code supplied from the profile determining unit 104 and the information concerning the respective pieces of the encoded data supplied from the slice header decoding unit 106. The parallel processing determining unit 107 supplies control information to the selector 108, the tile decoding unit 109, the tile decoding unit 110, and the frame memory 111 on the basis of the result of the determination.

The decoding of the encoded data processed in the main profile will now be described. FIG. 3B illustrates an example of the format of the encoded data. A case in which the tiles_or_entropy_coding_sync_idc code has a value of zero is illustrated in FIG. 3B. In this case, only one tile is included subsequently to the slice header. The parallel processing determining unit 107 sets the output destination from the selector 108 to the tile decoding unit 109 and causes the tile decoding unit 110 not to operate. The parallel processing determining unit 107 outputs a control signal instructing that the frame memory 111 receives the decoded image from the tile decoding unit 109 and stores the decoded image that is received.

FIG. 2 is a block diagram illustrating a detailed exemplary configuration of the tile decoding unit 109 and the tile decoding unit 110. Referring to FIG. 2, the tile decoding unit 109 and the tile decoding unit 110 each includes a terminal 201, a terminal 202, a terminal 203, a buffer 204, an entropy decoder 205, an occurrence probability table storage portion 206, a predictor 207, a pixel reproducer 208, a quantization parameter storage portion 209, a buffer 210, a terminal 211, an entropy decoder 215, an occurrence probability table storage portion 216, a predictor 217, a pixel reproducer 218, and a quantization parameter storage portion 219. The tile decoding unit 109 and the tile decoding unit 110 each receives the encoded data from the selector 108 in FIG. 1 with the terminal 201. The tile decoding unit 109 and the tile decoding unit 110 each receives the control signal from the parallel processing determining unit 107 in FIG. 1 with the terminal 202. The tile decoding unit 109 and the tile decoding unit 110 each receives the value of the quantization parameter that is decoded in the slice header decoding unit 106 and that is applied to the first block of the slice from the slice header decoding unit 106 in FIG. 1 with the terminal 203. The buffer 204 temporarily stores the encoded data that is received. The buffer 204 is capable of selecting necessary encoded data on the basis of the control signal received with the terminal 202 and outputting the selected encoded data to downstream portions. The entropy decoder 205 and the entropy decoder 215 each sequentially perform the decoding to reproduce a prediction error. However, the entropy decoder 205 and the entropy decoder 215 is each capable of selecting the sequential decoding or the decoding for every block line in the Wavefront processing in accordance with the control signal received with the terminal 202. Although it is assumed here that the decoding based on arithmetic encoding is performed as the decoding method, the decoding method is not limited to this. In addition, the entropy decoder 205 and the entropy decoder 215 each decode the code of information concerning the prediction for every block and the code concerning the quantization parameter to supply the result of the decoding to downstream portions. The occurrence probability table storage portion 206 and the occurrence probability table storage portion 216 store the occurrence probability tables that are updated in the entropy decoder 205 and the entropy decoder 215, respectively, as needed. The predictor 207 and the predictor 217 each generate a prediction value by intra-prediction or inter-prediction. The quantization parameter storage portion 209 and the quantization parameter storage portion 219 store the quantization parameters that are decoded and reproduced in the entropy decoder 205 and the entropy decoder 215, respectively. At the beginning of each slice, the quantization parameter decoded in the slice header decoding unit 106 in FIG. 1 is stored. The pixel reproducer 208 and the pixel reproducer 218 receive orthogonal transformation coefficients of the prediction errors that are quantized from the entropy decoder 205 and the entropy decoder 215, respectively, and dequantize the orthogonal transformation coefficients with the quantization parameters stored in the quantization parameter storage portion 209 and the quantization parameter storage portion 219, respectively. The pixel reproducer 208 and the pixel reproducer 218 perform inverse orthogonal transformation of the orthogonal transformation coefficients resulting from the dequantization to reproduce the prediction errors. The pixel reproducer 208 and the pixel reproducer 218 add the prediction values generated by the predictor 207 and the predictor 217, respectively, to the reproduced prediction errors to reproduce the pixels of the decoded images. The buffer 210 stores the reproduced pixels. The tile decoding unit 109 and the tile decoding unit 110 each supply the reproduced image data to the frame memory 111 in FIG. 1 from the terminal 211.

The tile decoding unit 109 that has received the encoded data in FIG. 3B accumulates the encoded data for every tile in the buffer 204 via the terminal 201. The buffer 204 supplies the encoded data to the entropy decoder 205 in accordance with the control signal received with the terminal 202. In this case, the entropy decoder 215 is caused not to operate. The buffer 210 sequentially receives pixel data from the pixel reproducer 208. The entropy decoder 205 decodes the encoded data that is received for every block and supplies the orthogonal transformation coefficient of the quantized prediction error to the pixel reproducer 208. The entropy decoder 205 sequentially updates the occurrence probability table of the arithmetic codes in the occurrence probability table storage portion 206 during the decoding. The entropy decoder 205 supplies the information concerning the prediction for every block to the predictor 207 and supplies any quantization parameter to the quantization parameter storage portion 209. The predictor 207 receives the information concerning the prediction, such as an intra-prediction mode, to generate the prediction value of each block from the image data that is stored in the buffer 210 and that is reproduced. The predictor 207 supplies the generated prediction value to the pixel reproducer 208. After the pixel reproducer 208 dequantizes the orthogonal transformation coefficient of the quantized prediction error with the quantization parameter stored in the quantization parameter storage portion 209, the pixel reproducer 208 reproduces the prediction error through the inverse orthogonal transformation. The pixel reproducer 208 adds the prediction error to the prediction value described above to reproduce the pixel values of the decoded image and stores the pixel values in the buffer 210. When the decoding of one tile is completed, the content of the buffer 210 is output from the terminal 211.

FIG. 3C illustrates an example of the format of the encoded data in a case in which the tiles_or_entropy_coding_sync_idc code has a value of one. In this case, the encoded data about multiple tiles is stored subsequently to the slice header. Although it is assumed here that the number of tiles is two, the number of tiles is not limited to two. FIG. 4A illustrates an example of how a picture is divided into tiles. In the example in FIG. 4A, a picture 401 is divided into a tile 402 and a tile 403. For example, when the picture has a size of 3,840×2,160, each tile has a size of 1,920×2,160. FIG. 4B illustrates an example of how each tile is divided into blocks. Dividing each tile into 64×64 blocks results in an arrangement in which 30 blocks are laterally arranged and 34 blocks are longitudinally arranged. The coordinate of each block is indicated with respect to an origin (0, 0) at the upper leftmost block and the lower rightmost block has a coordinate of (33, 29). In this case, the parallel processing determining unit 107 selects the tile decoding unit 109 or the tile decoding unit 110 as the output destination from the selector 108 depending on the tile that is received. The parallel processing determining unit 107 supplies the encoded data to the tile decoding unit 109 if the encoded data about the tile 402 is input into the selector 108 and supplies the encoded data to the tile decoding unit 110 if the encoded data about the tile 403 is input into the selector 108. The parallel processing determining unit 107 outputs the control signal instructing that the frame memory 111 receives the decoded image from each of the tile decoding unit 109 and the tile decoding unit 110 and appropriately stores the decoded image in the corresponding area.

The selector 108 that has received the encoded data in FIG. 3C supplies the encoded data about the tile 402 to the tile decoding unit 109 and supplies the encoded data about the tile 403 to the tile decoding unit 110.

The tile decoding unit 109 accumulates the encoded data for every tile in the buffer 204 via the terminal 201. Then, as in the decoding of the tile in the encoded data in FIG. 3B, the tile decoding unit 109 uses the entropy decoder 205, the occurrence probability table storage portion 206, the predictor 207, and the pixel reproducer 208 to reproduce the decoded image and stores the decoded image in the buffer 210. Concurrently with this, the tile decoding unit 110 also uses the entropy decoder 205, the occurrence probability table storage portion 206, the predictor 207, and the pixel reproducer 208 to reproduce the decoded image and stores the decoded image in the buffer 210. Referring back to FIG. 1, the frame memory 111 reads out the decoded images of the tiles from the buffer 210 in the tile decoding unit 109 and the buffer 210 in the tile decoding unit 110 and combines the decoded images with each other in the manner illustrated in FIG. 4A to reproduce and store the image data about the picture.

FIG. 3D illustrates an example of the format of the encoded data in a case in which the tiles_or_entropy_coding_sync_idc code has a value of two. In this case, the decoding is performed for every block line by the Wavefront processing. The encoded data about multiple block lines is stored subsequently to the slice header. When the picture 401 has a size of 3,840×2,160 in the state in which the picture is not divided in the example in FIG. 4A, dividing the picture into 64×64 blocks results in an arrangement in which 60 blocks are laterally arranged and 34 blocks are longitudinally arranged. The coordinate of each block is indicated with respect to the origin (0, 0) at the upper leftmost block and the lower rightmost block has a coordinate of (33, 59). In this case, the parallel processing determining unit 107 sets the output destination from the selector 108 to the tile decoding unit 109 and causes the tile decoding unit 110 not to operate. The parallel processing determining unit 107 outputs the control signal instructing that the frame memory 111 receives the decoded image from the tile decoding unit 109 and stores the decoded image. In addition, the tile decoding unit 109 is instructed to perform the decoding by the Wavefront processing. The quantization parameter decoded in the slice header decoding unit 106 is also supplied to the tile decoding unit 109 and the tile decoding unit 110. The quantization parameter is stored in the quantization parameter storage portion 209 and the quantization parameter storage portion 219 in the tile decoding unit. In the dequantization of the first block of each block line, the quantization parameter decoded in the slice header decoding unit 106 is used.

The tile decoding unit 109 that has received the encoded data in FIG. 3D accumulates the encoded data for every block line in the buffer 204 via the terminal 201. The buffer 204 supplies the encoded data to the entropy decoder 205 and the entropy decoder 215 in accordance with the control signal received with the terminal 202. When the block lines are numbered from 0 to 33 from the top block line, the encoded data on the even-numbered block lines is supplied to the entropy decoder 205 and the encoded data on the odd-numbered block lines is supplied to the entropy decoder 215. The entropy decoder 205 decodes the block data on a block line 0 laterally. The occurrence probability table after a block (0,2) is decoded is stored in the occurrence probability table storage portion 206. In other words, at the start of the decoding of a block (0,3), the occurrence probability table at the block (0,2) has been stored in the occurrence probability table storage portion 206. The pixel values of the decoded image are reproduced via the predictor 207, the quantization parameter storage portion 209, and the pixel reproducer 208 and the reproduced pixel values of the decoded image are stored in the buffer 310. When the decoding of one block line is completed, the content of the buffer 210 is output from the terminal 211. Then, the encoded data on the next even-numbered block line is received from the buffer 204 to start the decoding. However, the decoding of the first block on the block line is performed by using the occurrence probability table after a block (1,2) is decoded, which is stored in the occurrence probability table storage portion 216.

Upon completion of the decoding of the block (0,2), the entropy decoder 215 starts the decoding of a block line 1. The entropy decoder 215 performs the decoding by using the occurrence probability table after the block (0,2) is decoded, which is stored in the occurrence probability table storage portion 206. Then, the occurrence probability table or the result of update of the occurrence probability table is stored in the occurrence probability table storage portion 216 to update the occurrence probability table storage portion 216. The entropy decoder 215 decodes the encoded data that is received for every block and supplies the orthogonal transformation coefficient of the quantized prediction error to the pixel reproducer 218. The occurrence probability table after the block (1,2) is decoded is stored in the occurrence probability table storage portion 216. The entropy decoder 215 supplies the information concerning the prediction for every block to the predictor 217 and supplies any quantization parameter to the quantization parameter storage portion 219. The predictor 217 receives the information concerning the prediction to generate the prediction value of the block from the image data that is stored in the buffer 210 and that is reproduced. The generated prediction value is supplied to the pixel reproducer 218. After the pixel reproducer 218 dequantizes the orthogonal transformation coefficient of the quantized prediction error with the quantization parameter stored in the quantization parameter storage portion 319, the pixel reproducer 218 reproduces the prediction error through the inverse orthogonal transformation. The quantization parameter resulting from the decoding of the slice header is used for the first block. The pixel reproducer 218 adds the prediction error to the prediction value described above to reproduce the pixel values of the decoded image and stores the pixel values in the buffer 210. When the decoding of one block line is completed, the content of the buffer 210 is output from the terminal 211. Then, the encoded data on the next odd-numbered block line is received from the buffer 204 to start the decoding.

Accordingly, in the decoding of the first block on the (2i)-th block line, the entropy decoder 205 uses the occurrence probability table after a block ((2i−1),2) is decoded, which is stored in the occurrence probability table storage portion 216. In contrast, in the decoding of the first block on the (2i+1)-th block line, the entropy decoder 215 uses the occurrence probability table after a block ((2i),2) is decoded, which is stored in the occurrence probability table storage portion 206.

FIG. 3E illustrates an example of the format of the encoded data in a case in which the tiles_or_entropy_coding_sync_idc code has a value of three. This case only occurs when the profile determining unit 104 determines that the parallel profile is used. In this case, the encoded data about multiple tiles is stored subsequently to the slice header. Although it is assumed here that the number of tiles is two, the number of tiles is not limited to two. Each tile includes the encoded data for every block line and is decoded for every block line by the Wavefront processing. In this case, the parallel processing determining unit 107 selects the tile decoding unit 109 or the tile decoding unit 110 as the output destination from the selector 108 depending on the tile that is received. The parallel processing determining unit 107 supplies the encoded data to the tile decoding unit 109 if the encoded data about the tile 402 is input into the selector 108 and supplies the encoded data to the tile decoding unit 110 if the encoded data about the tile 403 is input into the selector 108. In addition, the parallel processing determining unit 107 instructs the tile decoding unit 109 and the tile decoding unit 110 to perform the decoding by the Wavefront processing. The parallel processing determining unit 107 outputs the control signal instructing that the frame memory 111 receives the decoded image from each of the tile decoding unit 109 and the tile decoding unit 110 and appropriately stores the decoded image in the corresponding area. As in the case in which the tiles_or_entropy_coding_sync_idc code has a value of one, the quantization parameter quantized in the slice header decoding unit 106 is also supplied to the tile decoding unit 109 and the tile decoding unit 110.

The tile decoding unit 109 that has received the encoded data in FIG. 3E accumulates the encoded data for every block line in the buffer 204 via the terminal 201. The encoded data is supplied to the entropy decoder 205 and the entropy decoder 215, as in the case in which the tiles_or_entropy_coding_sync_idc code has a value of two. Specifically, the buffer 204 supplies the encoded data on the even-numbered block lines to the entropy decoder 205 and supplies the encoded data on the odd-numbered block lines to the entropy decoder 215. The block lines in the tile 402 are alternately decoded by using the entropy decoder 205 and the entropy decoder 215, as in the case in which the tiles_or_entropy_coding_sync_idc code has a value of two. Each of the entropy decoder 205 and the entropy decoder 215 starts the decoding by using the occurrence probability table after a block (i,2) on the next upper block line is decoded. The decoded image is reproduced for every block line and the decoded images are combined in the manner illustrated in FIG. 4B to store the decoded image of the tile in the buffer 210. Referring back to FIG. 1, the frame memory 111 reads out the decoded images of the tiles from the buffer 210 in the tile decoding unit 109 and the buffer 210 in the tile decoding unit 110 and combines the decoded images in the manner illustrated in FIG. 4A to reproduce and store the image data about the picture. Then, the image data is output from the terminal 112.

FIG. 5 is a flowchart illustrating an exemplary image decoding process in the image decoding apparatus according to the first embodiment. Referring to FIG. 5, in Step S501, the sequence header decoding unit 103 decodes the sequence header and decodes the profile_idc code and the level_idc code to reproduce the profile information and the level information.

In Step S502, the sequence header decoding unit 103 decodes the sequence header and decodes the pic_width_in_luma_samples code and the pic_height_in_luma_samples code to reproduce the size of the picture. In Step S503, the sequence header decoding unit 103 decodes the sequence header and decodes the tiles_or_entropy_coding_sync_idc code to reproduce any of the values zero to three.

In Step S504, the sequence header decoding unit 103 decodes the sequence header and decodes a num_tile_columns_minus1 code and a num_tile_rows_minus1 code to reproduce the number of divided tiles. A number of divided tiles T is calculated by (num_tile_columns_minus1+1)× (num_tile_rows_minus1+1). In Step S505, the parallel processing determining unit 107 sets a variable i for counting the number of tiles to zero.

In Step S506, the parallel processing determining unit 107 determines the value of the tiles_or_entropy_coding_sync_idc code. If the tiles_or_entropy_coding_sync_idc code has a value of one or three, that is, when multiple tiles are used, the process goes to Steps S511 and S512. Step S511 and the subsequent steps and Step S512 and the subsequent steps are processed in parallel. If the tiles_or_entropy_coding_sync_idc code has a value other than one and three, the process goes to Step S507.

In Step S507, the parallel processing determining unit 107 determines the value of the tiles_or_entropy_coding_sync_idc code. The process goes to Step S508 if the tiles_or_entropy_coding_sync_idc code has a value of two, that is, when the Wavefront processing is performed and otherwise goes to Step S509. In Step S508, the tile decoding unit 109 decodes the block lines in the 0-th tile in parallel by the Wavefront processing to generate the decoded image. In Step S509, the tile decoding unit 109 decodes the 0-th tile by a sequential decoding processing, which is not the Wavefront processing, to generate the decoded image. In Step S510, the parallel processing determining unit 107 adds one to the variable i for counting the number of tiles. Then, the process goes to Step S518.

In Step S511, the parallel processing determining unit 107 determines the value of the tiles_or_entropy_coding_sync_idc code. The process goes to Step S513 if the tiles_or_entropy_coding_sync_idc code has a value of three and otherwise goes to Step S514. In Step S513, the tile decoding unit 109 decodes the block lines in the i-th tile in parallel by the Wavefront processing to generate the decoded image. In Step S514, the tile decoding unit 109 decodes the i-th tile by a sequential decoding processing, which is not the Wavefront processing, to generate the decoded image.

In Step S512, the parallel processing determining unit 107 determines the value of the tiles_or_entropy_coding_sync_idc code. The process goes to Step S515 if the tiles_or_entropy_coding_sync_idc code has a value of three and otherwise goes to Step S516.

In Step S515, the tile decoding unit 109 decodes the block lines in the (i+1)-th tile in parallel by the Wavefront processing to generate the decoded image. In Step S516, the tile decoding unit 109 decodes the (i+1)-th tile by a sequential decoding processing, which is not the Wavefront processing, to generate the decoded image. In Step S517, the parallel processing determining unit 107 adds two to the variable i for counting the number of tiles. In Step S518, the parallel processing determining unit 107 compares the variable i for counting the number of tiles with the number of tiles T. The process goes back to Step S506 if the variable i for counting the number of tiles is smaller than the number of tiles T and otherwise goes to Step S519.

In Step S519, the header separating unit 102 terminates the decoding process upon detection of End_of_Sequence (EOS). The process otherwise goes back to Step S505 to start the decoding of the next picture.

With the above configuration and operation, it is possible to perform the parallel processing for every block line, such as the Wavefront processing, in each tile resulting from division of a picture. In addition, limiting the function depending on the profile allows an apparatus in which the parallel processing is not necessary or image data capable of being sufficiently decoded with sequential processing to be realized without placing an unnecessary load on the apparatus or the image data.

Although the case in which a picture is divided into two tiles is described in the present embodiment, the number of divided tiles and the dividing method are not limited to the above ones. In the example in FIG. 4A, the tile 402 and the tile 403 may be vertically divided. Even in the case in which the number of divided tiles is increased, adding one or more tile decoding units similar to the tile decoding unit 109 and the tile decoding unit 110 in FIG. 1 allows a larger number of tiles to be supported.

Although the Wavefront parallel processing is described in the two block lines with reference to FIG. 2 in the present embodiment, the number of the parallel processing tasks is not limited to two. Adding one or more groups of the entropy decoder 205, the occurrence probability table storage portion 206, the predictor 207, the pixel reproducer 208, and the quantization parameter storage portion 209 in FIG. 2 allows the block lines of a larger number to be processed in parallel.

Although the arithmetic codes are exemplified in the decoding in each entropy decoder in the present embodiment, the decoding is not limited to this. In addition, although the occurrence probability table is exemplified as the statistical information updated with the arithmetic codes, the statistical information is not limited to this.

Although the quantization parameter described in the slice header is used as the quantization parameter for the dequantization at the first block in the Wavefront processing, the quantization parameter for the dequantization at the first block in the Wavefront processing is not limited to this. For example, the quantization parameter of a block having the occurrence probability table which the arithmetic codes refer to may be used. Alternatively, when the quantization parameter is updated at the beginning of the next previous block line, the quantization parameter at the beginning of the next previous block line may be used.

Although the tiles_or_entropy_coding_sync_idc code is used for the description in the present embodiment, the tiles_or_entropy_coding_sync_idc code is not limitedly used. For example, a multi_tile_exist_flag code representing the presence of multiple tiles and a wavefront_proc_flag code representing the presence of the Wavefront processing in the tile may be used. Specifically, one picture includes only one tile if the multi_tile_exist_flag code has a value of zero and one picture includes multiple tiles if the multi_tile_exist_flag code has a value of one. The Wavefront processing is not performed in the tile if the wavefront_proc_flag code has a value of zero and the Wavefront processing is performed if the wavefront_proc_flag code has a value of one. At least one of the multi_tile_exist_flag code and the wavefront_proc_flag code should have a value of zero in the main profile while both the multi_tile_exist_flag code and the wavefront_proc_flag code may have a value of one in the parallel profile.

Although the arithmetic codes are exemplified as the entropy encoding method in the present embodiment, the entropy encoding method is not limited to this. For example, any encoding method with reference to the amount of statistics in the next upper block line or the codes occurring in the next upper block line may be used.

Although the occurrence probability table, after the second block on the next upper block line is decoded, is used in the decoding of the first block of each block line in the Wavefront processing in the present embodiment, the occurrence probability table is not limited to the above one. For example, the occurrence probability table after a block shifted from the first block by an arbitrary number is decoded may be used or the occurrence probability table at the first block may be constantly used.

Although the case in which the information concerning the tile division exists in the sequence parameter set is described in the present embodiment, the information concerning the tile division is not limited to the above case. The information concerning the tile division may exist in the picture parameter set, as in an example illustrated in FIG. 11, or may be described in another header. In this case, in Step S504 in FIG. 5, the decoding of the information is performed in the decoding of the picture header.

Although the case in which the tile includes the block lines of an even number is described in the tile division in the present embodiment, Step S511 and the subsequent steps are performed to the last remaining tile and Step S512 and the subsequent steps are not performed when the tile includes the block lines of an odd number.

The picture has one tile if the tiles_or_entropy_coding_sync_idc code has a value of zero or two. Accordingly, the decoding of the num_tile_columns_minus1 code and so on in Step S504 may be omitted.

Second Exemplary Embodiment

A second exemplary embodiment of the present invention will now be described with reference to the drawings. FIG. 6 is a block diagram illustrating an exemplary configuration of an image encoding apparatus according to the second embodiment. The bit stream having the image encoding format described in the first embodiment is to be generated in the second embodiment. Referring to FIG. 6, the image encoding apparatus includes a terminal 601, a frame memory 602, a profile setting unit 603, a parallel processing setting unit 604, a sequence header encoding unit 605, a picture header encoding unit 606, a slice header encoding unit 607, a selector 608, a tile encoding unit 609, a tile encoding unit 610, a combining unit 611, and a terminal 612. The image encoding apparatus receives image data for every picture with the terminal 601. The frame memory 602 stores the image data that is received. The profile setting unit 603 sets a profile in the encoding of the image data. Although the main profile and the parallel profile described above in the first embodiment are exemplified in the present embodiment for simplicity, a profile other than the main profile and the parallel profile may be used. The parallel processing setting unit 604 refers to the profile that is set to determine whether the parallel processing is performed. The sequence header encoding unit 605 encodes a sequence parameter set including the profile set in the profile setting unit 603 and the result in the parallel processing setting unit 604. The picture header encoding unit 606 encodes a picture header. The slice header encoding unit 607 encodes a slice header, which is the header of each slice. The selector 608 sets the output destination on the basis of the output from the parallel processing setting unit 604. The tile encoding unit 609 and the tile encoding unit 610 perform the encoding for every tile. The combining unit 611 combines the pieces of encoded data supplied from the sequence header encoding unit 605, the picture header encoding unit 606, the slice header encoding unit 607, the tile encoding unit 609, and the tile encoding unit 610 with each other to generate a bit stream. The image encoding apparatus externally outputs the generated bit stream from the terminal 612.

An encoding operation of an image in the image encoding apparatus will now be described. Prior to the encoding of a picture, the encoding of various headers are performed. The profile setting unit 603 determines a profile from the application of the bit stream and so on and supplies the determined profile to downstream units. The parallel processing setting unit 604 refers to the determined profile to determine the value of the tiles_or_entropy_coding_sync_idc code. The meaning of each value of the tiles_or_entropy_coding_sync_idc code is indicated in Table 1 in the first embodiment. First, the sequence header encoding unit 605 operates to encode the outputs from the profile setting unit 603 and the parallel processing setting unit 604 and the characteristics of the image to be encoded as the sequence parameter set and supplies the sequence parameter set to the combining unit 611. The encoding method is not particularly limited and, for example, Huffman codes or arithmetic codes may be used. The picture header encoding unit 606 encodes a picture parameter set and supplies the picture parameter set to the combining unit 611. The combining unit 611 appropriately combines the pieces of encoded data about the above headers with each other to generate the bit stream from the header of the bit stream to the picture parameter set in FIG. 3A. The bit stream is output from the terminal 612.

Then, the image encoding apparatus receives the image data to be encoded for every picture with the terminal 601. The encoding process for every picture is subsequently performed. A case in which the parallel processing setting unit 604 sets the value of the tiles_or_entropy_coding_sync_idc code to zero will now be described. The parallel processing setting unit 604 sets the output destination from the selector 608 to the tile encoding unit 609 in accordance with a control signal from the parallel processing setting unit 604. The tile encoding unit 610 is caused not to operate. The combining unit 611 receives the encoded data from the tile encoding unit 609.

The selector 608 supplies the image data corresponding to one tile, in the image data about the picture stored in the frame memory 602, to the tile encoding unit 609. The slice header encoding unit 607 encodes the quantization parameter to be applied to the first block and supplies the quantization parameter that is encoded to the combining unit 611 along with the result of the encoding of the other header information. The tile encoding unit 609 divides the image data that is received into blocks and sequentially encodes the blocks.

FIG. 7 is a block diagram illustrating a detailed exemplary configuration of the tile encoding unit 609 and the tile encoding unit 610. Referring to FIG. 7, the tile encoding unit 609 and the tile encoding unit 610 each include a terminal 701, a terminal 702, a terminal 703, a buffer 704, a prediction error generator 705, a quantization parameter storage portion 706, an entropy encoder 707, an occurrence probability table storage portion 708, a buffer 709, a terminal 710, a prediction error generator 715, a quantization parameter storage portion 716, an entropy encoder 717, and an occurrence probability table storage portion 718. The tile encoding unit 609 and the tile encoding unit 610 each receive the image data for every tile from the frame memory 602 in FIG. 6 with the terminal 701. The tile encoding unit 609 and the tile encoding unit 610 each receive the value of the tiles_or_entropy_coding_sync_idc code from the parallel processing setting unit 604 in FIG. 6 with the terminal 702. The tile encoding unit 609 and the tile encoding unit 610 each receive the value of the quantization parameter to be applied to the first block of the slice, which is encoded in the slice header encoding unit 607, with the terminal 703.

The buffer 704 stores the image data corresponding to one tile. The buffer 704 supplies the image data only to the downstream prediction error generator 705 if the tiles_or_entropy_coding_sync_idc code has a value of zero or one. The buffer 704 appropriately supplies the image data about each tile to the downstream prediction error generator 705 and the downstream prediction error generator 715 if the tiles_or_entropy_coding_sync_idc code has a value of two or three. The prediction error generator 705 and the prediction error generator 715 each perform the prediction, for example, the intra-prediction or motion compensation, to the image data that is received for every block to determine information concerning the prediction. Then, the prediction error generator 705 and the prediction error generator 715 each generate the prediction value while referring to the buffer 709 or other pictures that have been encoded, as needed, on the basis of the determined information concerning the prediction. The prediction error generator 705 and the prediction error generator 715 each perform orthogonal transformation to a value resulting from subtraction of the prediction value from the pixel that is received, quantize the result of the orthogonal transformation with the quantization parameter that is appropriately determined, and output the result of the quantization. The quantization parameter storage portion 706 and the quantization parameter storage portion 716 each store the determined quantization parameter. The quantization parameter storage portion 706 and the quantization parameter storage portion 716 each separately store the value of the quantization parameter to be applied to the first block of the slice, which is received with the terminal 703. The entropy encoder 707 and the entropy encoder 717 each perform the arithmetic encoding. The processing performed by the entropy encoder 707 and the entropy encoder 717 is not limited to the arithmetic encoding. The occurrence probability table storage portion 708 and the occurrence probability table storage portion 718 store the occurrence probability tables updated by the entropy encoder 707 and the entropy encoder 717, respectively. The buffer 709 stores the encoded data that is generated. The image encoding apparatus supplies the encoded data that is generated to the combining unit 611 in FIG. 6 from the terminal 710.

A case in which the tiles_or_entropy_coding_sync_idc code received with the terminal 702 has a value of zero will now be described. The buffer 704 supplies the image data only to the prediction error generator 705. The prediction error generator 715, the quantization parameter storage portion 716, the entropy encoder 717, and the occurrence probability table storage portion 718 are caused not to operate. The buffer 709 receives the encoded data from the entropy encoder 707.

The image data received with the terminal 701 is supplied to the prediction error generator 705 for every block. The prediction error generator 705 generates the prediction value by the determination of the predicting method and the prediction based on the determined predicting method. The prediction error generator 705 supplies the determined predicting method and information necessary for the prediction to the entropy encoder 707. The prediction error generator 705 calculates the prediction error from the difference between the generated prediction value and the received image data. The prediction error generator 705 performs the orthogonal transformation to the prediction error to generate the orthogonal transformation coefficient and quantizes the orthogonal transformation coefficient with the quantization parameter in the quantization parameter storage portion 706. The quantization parameter is appropriately updated and the updated quantization parameter is stored in the quantization parameter storage portion 706. The prediction error generator 705 supplies the result of the quantization to the entropy encoder 707. The entropy encoder 707 receives the information concerning the prediction and the result of the quantization and sequentially performs the encoding for every block while referring to the occurrence probability table stored in the occurrence probability table storage portion 708. The entropy encoder 707 updates the occurrence probability table during the encoding. The buffer 709 stores the encoded data about the blocks corresponding to one tile and the encoded data is output from the terminal 710. Referring back to FIG. 6, the combining unit 611 combines the pieces of encoded data about the image of the tile from the tile encoding unit 609 with each other so that the bit stream in FIG. 3B is generated.

A case in which the tiles_or_entropy_coding_sync_idc code received with the terminal 702 has a value of one will now be described. It is assumed here that the picture is divided into the tiles in the manner illustrated in FIG. 4A, as in the first embodiment. Referring to FIG. 6, the selector 608 appropriately selects the tile encoding unit 609 as the output destination of the image data about the tile 402 and the tile encoding unit 610 as the output destination of the image data about the tile 403 in accordance with the control signal from the parallel processing setting unit 604. The combining unit 611 is controlled so as to receive the pieces of encoded data about the tiles from the tile encoding unit 609 and the tile encoding unit 610.

The image data about the tile 402 supplied from the frame memory 602 is supplied to the tile encoding unit 609 and, concurrently, the image data about the tile 403 supplied from the frame memory 602 is supplied to the tile encoding unit 610. The tile encoding unit 609 receives the image data about the tile with the terminal 701 in FIG. 7 and stores the image data in the buffer 704. The buffer 704 supplies the image data only to the prediction error generator 705 in accordance with the control signal received with the terminal 702. The prediction error generator 715, the quantization parameter storage portion 716, the entropy encoder 717, and the occurrence probability table storage portion 718 are caused not to operate. The buffer 709 receives the encoded data from the entropy encoder 707 and the encoded data is output from the terminal 710. Then, the encoding is performed in the same manner as in the case in which the tiles_or_entropy_coding_sync_idc code has a value of zero. Concurrently, the tile encoding unit 610 also uses the buffer 704, the prediction error generator 705, the quantization parameter storage portion 706, the entropy encoder 707, the occurrence probability table storage portion 708, and the buffer 709 to encode the image data about the tile. The buffer 709 receives the encoded data from the entropy encoder 707 and the encoded data is output from the terminal 710. Referring back to FIG. 6, the combining unit 611 combines the encoded data about the tile 402 supplied from the tile encoding unit 609 with the encoded data about the tile 403 supplied from the tile encoding unit 610 so that the bit stream illustrated in FIG. 3C is generated.

A case in which the tiles_or_entropy_coding_sync_idc code received with the terminal 702 has a value of two will now be described. Referring to FIG. 6, the selector 608 selects only the tile encoding unit 609 as the output destination of the image data in accordance with the control signal from the parallel processing setting unit 604. The processing in the tile encoding unit 609 is controlled so as to perform the encoding by the Wavefront processing for every block line. The combining unit 611 is controlled so as to receive the encoded data about the tile from the tile encoding unit 609.

The image data about the picture supplied from the frame memory 602 is supplied to the tile encoding unit 609.

The tile encoding unit 609 receives the image data about the tile with the terminal 701 in FIG. 7 and stores the image data in the buffer 704. The buffer 704 supplies the image data on the even-numbered block lines to the prediction error generator 705 and supplies the image data on the odd-numbered block lines to the prediction error generator 715 in accordance with the control signal received with the terminal 702.

The prediction error generator 705 performs the processing for every block in each even-numbered block line in the same manner as in the case in which the tiles_or_entropy_coding_sync_idc code has a value of zero and the case in which the tiles_or_entropy_coding_sync_idc code has a value of one. Specifically, the prediction error generator 705 generates the prediction value, calculates the prediction error, performs the orthogonal transformation, and performs the quantization with the quantization parameter in the quantization parameter storage portion 706. The prediction error generator 705 supplies the result of the quantization and the predicting method to the entropy encoder 707. However, the quantization parameter received with the terminal 703 is used as the quantization parameter for the first block. The quantization parameter is appropriately updated and the updated quantization parameter is stored in the quantization parameter storage portion 706. The entropy encoder 707 encodes the image data for every block. The occurrence probability table after the block (0,2) is encoded is stored in the occurrence probability table storage portion 708. In other words, at the start of the encoding of the block (0,3), the occurrence probability table at the block (0,2) has been stored in the occurrence probability table storage portion 708. The generated encoded data for every block is stored in the buffer 709. When the encoding of one block line is completed, the content of the buffer 709 is output from the terminal 710. Then, the image data about the subsequent even-numbered (2i)-th block line is received from the buffer 704 to start the encoding (i is an integer larger than or equal to zero). However, the first block is encoded by using the occurrence probability table after the block ((2i−1),2) on the next previous odd-numbered block line is encoded, which is stored in the occurrence probability table storage portion 718.

The prediction error generator 715 performs the processing for every block in each odd-numbered block line in the same manner as in the case in which the tiles_or_entropy_coding_sync_idc code has a value of zero and the case in which the tiles_or_entropy_coding_sync_idc code has a value of one. Specifically, the prediction error generator 715 generates the prediction value, calculates the prediction error, performs the orthogonal transformation, and preforms the quantization with the quantization parameter in the quantization parameter storage portion 716. The prediction error generator 715 supplies the result of the quantization and the predicting method to the entropy encoder 717. The entropy encoder 717 starts the encoding of the block line at a time when the entropy encoder 707 completes the encoding of the block (0,2). The entropy encoder 717 performs the encoding by using the occurrence probability table after the block (0,2) is encoded, which is stored in the occurrence probability table storage portion 708. The occurrence probability table after the block (1,2) is encoded is stored in the occurrence probability table storage portion 718. The entropy encoder 717 encodes the encoded data that is received for every block. The generated encoded data for every block is stored in the buffer 709. When the encoding of one block line is completed, the content of the buffer 709 is output from the terminal 710. Then, the image data about the subsequent odd-numbered (2i+1)-th block line is received from the buffer 704 to start the encoding. However, the first block is encoded by using the occurrence probability table after the block ((2i),2) on the next previous even-numbered block line is encoded, which is stored in the occurrence probability table storage portion 708. The buffer 709 receives the encoded data from the entropy encoder 707 and the entropy encoder 717 and the encoded data is output from the terminal 710. Referring back to FIG. 6, the combining unit 611 combines the pieces of encoded data about the block lines supplied from the tile encoding unit 609 with each other so that the bit stream illustrated in FIG. 3D is generated.

A case in which the tiles_or_entropy_coding_sync_idc code received with the terminal 702 has a value of three will now be described. It is assumed here that the picture is divided into the tiles in the manner illustrated in FIG. 4A, as in the first embodiment. Referring to FIG. 6, the selector 608 appropriately selects the tile encoding unit 609 as the output destination of the image data about the tile 402 and the tile encoding unit 610 as the output destination of the image data about the tile 403 in accordance with the control signal from the parallel processing setting unit 604. The processing in the tile encoding unit 609 and the tile encoding unit 610 is controlled so as to perform the encoding by the Wavefront processing for every block line. The combining unit 611 is controlled so as to receive the pieces of encoded data about the tiles from the tile encoding unit 609 and the tile encoding unit 610.

The image data about the tile 402 supplied from the frame memory 602 is supplied to the tile encoding unit 609 and, concurrently, the image data about the tile 403 supplied from the frame memory 602 is supplied to the tile encoding unit 610.

The tile encoding unit 609 receives the image data about the tile with the terminal 701 in FIG. 7 and stores the image data in the buffer 704. The buffer 704 supplies the image data on the even-numbered block lines to the prediction error generator 705 and supplies the image data on the odd-numbered block lines to the prediction error generator 715 in accordance with the control signal received with the terminal 702. The prediction error generator 705 performs the processing for every block in each even-numbered block line in the same manner as in the case in which the tiles_or_entropy_coding_sync_idc code has a value of two. Specifically, the prediction error generator 705 generates the prediction value, calculates the prediction error, performs the orthogonal transformation, and performs the quantization with the quantization parameter in the quantization parameter storage portion 706. The prediction error generator 705 supplies the result of the quantization and the predicting method to the entropy encoder 707. The entropy encoder 707 encodes the image data for every block. The occurrence probability table after the block (0,2) is encoded is stored in the occurrence probability table storage portion 708.

The prediction error generator 715 performs the processing for every block in each odd-numbered block line in the same manner as in the case in which the tiles_or_entropy_coding_sync_idc code has a value of two. Specifically, the prediction error generator 715 generates the prediction value, calculates the prediction error, performs the orthogonal transformation, and performs the quantization with the quantization parameter in the quantization parameter storage portion 716. The prediction error generator 715 supplies the result of the quantization and the predicting method to the entropy encoder 717. The entropy encoder 717 starts the encoding of the block line at a time when the entropy encoder 707 completes the encoding of the block (0,2). The entropy encoder 717 sequentially encodes the image data for every block. The occurrence probability table after the block (1,2) is encoded is stored in the occurrence probability table storage portion 718.

Accordingly, in the encoding of the first block on the (2i)-th block line, the entropy encoder 707 uses the occurrence probability table after the block ((2i−1),2) is encoded, which is stored in the occurrence probability table storage portion 718. In contrast, in the encoding of the first block on the (2i+1)-th block line, the entropy encoder 717 uses the occurrence probability table after the block ((2i),2) is encoded, which is stored in the occurrence probability table storage portion 708.

The buffer 709 receives the pieces of encoded data from the entropy encoder 707 and the entropy encoder 717 and the pieces of encoded data are output from the terminal 710. Referring back to FIG. 6, the combining unit 611 combines the encoded data about the block lines supplied from the tile encoding unit 609 with the encoded data about the block lines supplied from the tile encoding unit 610 so that the bit stream illustrated in FIG. 3E is generated.

FIG. 8 is a flowchart illustrating an exemplary image encoding process in the image encoding apparatus according to the second embodiment.

Referring to FIG. 8, in Step S801, the profile setting unit 603 sets a profile and the sequence header encoding unit 605 encodes the profile and the level to generate the profile_idc code and the level_idc code. In Step S802, the sequence header encoding unit 605 encodes the image size to generate the pic_width_in_luma_samples code and the pic_height_in_luma_samples code. In Step S803, the parallel processing setting unit 604 sets a value of any of zero to two for the tiles_or_entropy_coding_sync_idc code when the profile is the main profile. The parallel processing setting unit 604 sets a value of any of zero to three for the tiles_or_entropy_coding_sync_idc code when the profile is the parallel profile. Then, the sequence header encoding unit 605 generates the tiles_or_entropy_coding_sync_idc code.

In Step S804, the parallel processing setting unit 604 determines the number of divided tiles of the picture and the sequence header encoding unit 605 encodes the number of divided tiles to generate the num_tile_columns_minus1 code and the num_tile_rows_minus1 code. In Step S805, the parallel processing setting unit 604 sets a variable f for counting the number of pictures to be encoded to zero. It is assumed in the present embodiment that F-number pictures are to be encoded. In Step S806, the parallel processing setting unit 604 sets the variable i for counting the number of tiles to zero.

In Step S807, the parallel processing setting unit 604 determines the value the tiles_or_entropy_coding_sync_idc code. If the tiles_or_entropy_coding_sync_idc code has a value of one or three, the process goes to Step S812 and Step S813. The process otherwise goes to Step S808. Step S812 and the subsequent steps and Step S813 and the subsequent steps are processed in parallel. In Step S808, the parallel processing setting unit 604 determines the value of the tiles_or_entropy_coding_sync_idc code. The process goes to Step S809 if the tiles_or_entropy_coding_sync_idc code has a value of two and otherwise goes to Step S810.

In Step S809, the tile encoding unit 609 encodes the block lines in the 0-th tile in parallel by the Wavefront processing to generate the encoded data. In Step S810, the tile encoding unit 609 encodes the 0-th tile by a sequential encoding processing, which is not the Wavefront processing, to generate the encoded data. In Step S811, the parallel processing setting unit 604 adds one to the variable i for counting the number of tiles. Then, the process goes to Step S819.

In Step S812, the parallel processing setting unit 604 determines the value of the tiles_or_entropy_coding_sync_idc code. The process goes to Step S814 if the tiles_or_entropy_coding_sync_idc code has a value of three and otherwise goes to Step S815. In Step S813, the parallel processing setting unit 604 determines the value of the tiles_or_entropy_coding_sync_idc code. The process goes to Step S816 if the tiles_or_entropy_coding_sync_idc code has a value of three and otherwise goes to Step S817.

In Step S814, the tile encoding unit 609 encodes the block lines in the i-th tile in parallel by the Wavefront processing to generate the encoded data. In Step S815, the tile encoding unit 609 encodes the i-th tile by a sequential encoding processing, which is not the Wavefront processing, to generate the encoded data.

In Step S816, the tile encoding unit 609 encodes the block lines in the (i+1)-th tile in parallel by the Wavefront processing to generate the encoded data. In Step S817, the tile encoding unit 609 encodes the (i+1)-th tile by a sequential encoding processing, which is not the Wavefront processing, to generate the encoded data.

In Step S818, the parallel processing setting unit 604 adds two to the variable i for counting the number of tiles. In Step S819, the parallel processing setting unit 604 compares the variable i for counting the number of tiles with the number of tiles T. The process goes back to Step S807 if the variable i for counting the number of tiles is smaller than the number of tiles T and otherwise goes to Step S820.

In Step S820, the parallel processing setting unit 604 adds one to the variable f for counting the number of pictures. In Step S821, the parallel processing setting unit 604 compares the variable f for counting the number of pictures with the total number of pictures F to be encoded. The process goes back to Step S806 if the variable f for counting the number of pictures is smaller than the total number of pictures F and otherwise goes to Step S822. In Step S822, the combining unit 611 outputs the EOS indicating the end of the bit stream from the terminal 612. Then, the process in FIG. 8 is terminated.

With the above configuration and operation, it is possible to generate the bit stream having the encoding format that enables the parallel processing for every block line, such as the Wavefront processing, in each tile resulting from division of a picture. In addition, appropriately limiting the function depending on the profile at the encoder side allows an apparatus in which the parallel processing is not necessary or image data capable of being sufficiently encoded with sequential processing to be realized without placing an unnecessary load on the apparatus or the image data.

Although the case in which a picture is divided into two tiles is described in the present embodiment, the number of divided tiles and the dividing method are not limited to the above ones. In the example in FIG. 4A, the tile 402 and the tile 403 may be vertically divided. Even in the case in which the number of divided tiles is increased, adding one or more tile encoding units similar to the tile encoding unit 609 and the tile encoding unit 610 in FIG. 6 allows a larger number of tiles to be supported.

Although the Wavefront parallel processing is described in the two block lines in the present embodiment, the number of the parallel processing tasks is not limited to two. Adding one or more groups of the prediction error generator 705, the quantization parameter storage portion 706, the entropy encoder 707, and the occurrence probability table storage portion 708 in FIG. 7 allows the block lines of a larger number to be processed in parallel.

Although the arithmetic codes are exemplified in the encoding in each entropy encoder in the present embodiment, the encoding is not limited to this. In addition, although the occurrence probability table is exemplified as the statistical information updated with the arithmetic codes, the statistical information is not limited to this.

Although the quantization parameter described in the slice header is used as the quantization parameter for the dequantization at the first block in the Wavefront processing, the quantization parameter for the dequantization at the first block in the Wavefront processing is not limited to this. For example, the quantization parameter of a block having the occurrence probability table which the arithmetic codes refer to may be used. Alternatively, when the quantization parameter is updated at the beginning of the next previous block line, the quantization parameter at the beginning of the next previous block line may be used.

Although the tiles_or_entropy_coding_sync_idc code is used for the description in the present embodiment, the tiles_or_entropy_coding_sync_idc code is not limitedly used. For example, the multi_tile_exist_flag code representing the presence of multiple tiles and the wavefront_proc_flag code representing the presence of the Wavefront processing in the tile may be used. Specifically, one picture includes only one tile if the multi_tile_exist_flag code has a value of zero and one picture includes multiple tiles if the multi_tile_exist_flag code has a value of one. The Wavefront processing is not performed in the tile if the wavefront_proc_flag code has a value of zero and the Wavefront processing is performed if the wavefront_proc_flag code has a value of one. At least one of the multi_tile_exist_flag code and the wavefront_proc_flag code should have a value of zero in the main profile while both the multi_tile_exist_flag code and the wavefront_proc_flag code may have a value of one in the parallel profile.

Although the occurrence probability table after the second block on the next upper block line is encoded is used in the encoding of the first block of each block line in the Wavefront processing in the present embodiment, the occurrence probability table is not limited to the above one. For example, the occurrence probability table after a block shifted from the first block by an arbitrary number is encoded may be used or the occurrence probability table at the first block may be constantly used.

Although the encoding is terminated after the number of frames is counted to detect the termination of the sequence, the termination of the encoding is not limited to this. For example, since the number of frames is not limited in real-time encoding transmission, a signal indicating the end of the sequence may be received from a system to terminate the encoding.

The availability of the tiles_or_entropy_coding_sync_idc code having a value of three may be determined in advance depending on the level in the setting of the profile and the level in Step S801 and the setting of the parallel processing method in Step S803 in FIG. 8. This will be described with reference to Table 2.

TABLE 2

| Level | Maximum number of pixels in picture (luminance) | Maximum pixel rate | Typical image format | Availability |
|---|---|---|---|---|
| 1 | 36,864 | 552,960 | 176 × 144 × 15 fps | Unavailable |
| 2 | 122,880 | 3,686,400 | 352 × 288 × 30 fps | Unavailable |
| 3 | 458,752 | 13,762,560 | 854 × 480 × 30 fps | Unavailable |
| 3.1 | 983,040 | 33,177,600 | 1280 × 720 × 33.7 fps | Unavailable |
| 4, 4.1 | 2,088,960 | 62,668,800 | 1920 × 1088 × 30 fps | Unavailable |
| 4.2, 4.3 | 2,228,224 | 133,693,440 | 2048 × 1536 * 60 fps | Unavailable |
| 5, 5.1 | 8,912,896 | 267,386,880 | 4096 × 2160 × 30 fps | Unavailable |
| 5.2 | 8,912,896 | 534,773,760 | 4096 × 2160 × 60 fps | Unavailable |
| 6 | 33,423,360 | 1,002,700,800 | 7680 × 4320 × 30 fps | Available |
| 6.1 | 33,423,360 | 2,005,401,600 | 7680 × 4320 × 60 fps | Available |
| 6.2 | 33,423,360 | 4,010,803,200 | 7680 × 4320 × 120 fps | Available |

When the picture has a small size, the use of multiple parallel processing methods has low effect of the speed-up owing to the parallel processing, compared with an increase in the complexity in the parallel control, to increase the reduction in encoding efficiency involved in the parallel processing. Accordingly, when the image size is small or the frame rate is low, the parallel processing is inhibited from being performed. This allows the speed-up in the parallel processing to be balanced with the complexity in mounting and the size.

When the picture has a large size, determining the number of divided tiles depending on the profile allows the size of the processing to be uniformed in the profile. This will be described with reference to Table 3.

TABLE 3

| Level | Maximum number of pixels in picture (luminance) | Maximum pixel rate | Typical image format | How to divide tile | Availability |
|---|---|---|---|---|---|
| 1 | 36,864 | 552,960 | 176 × 144 × 15 fps | 1 | Unavailable |
| 2 | 122,880 | 3,686,400 | 352 × 288 × 30 fps | 1 | Unavailable |
| 3 | 458,752 | 13,762,560 | 854 × 480 × 30 fps | 1 | Unavailable |
| 3.1 | 983,040 | 33,177,600 | 1280 × 720 × 33.7 fps | 1 | Unavailable |
| 4, 4.1 | 2,088,960 | 62,668,800 | 1920 × 1088 × 30 fps | 1 | Unavailable |
| 4.2, 4.3 | 2,228,224 | 133,693,440 | 2048 × 1536 * 60 fps | 1 × 2 | Unavailable |
| 5, 5.1 | 8,912,896 | 267,386,880 | 4096 × 2160 × 30 fps | 2 × 2 | Unavailable |
| 5.2 | 8,912,896 | 534,773,760 | 4096 × 2160 × 60 fps | 2 × 2 | Unavailable |
| 6 | 33,423,360 | 1,002,700,800 | 7680 × 4320 × 30 fps | 4 × 4 | Available |
| 6.1 | 33,423,360 | 2,005,401,600 | 7680 × 4320 × 60 fps | 4 × 4 | Available |
| 6.2 | 33,423,360 | 4,010,803,200 | 7680 × 4320 × 120 fps | 8 × 8 | Available |

When the picture has a large size or the frame rate is high, the tile division is performed so that the tile has a certain uniform size. For example, if the number of horizontal pixels exceeds a certain maximum number of horizontal pixels N (2,048 here), the horizontal division is performed. If the number of vertical pixels exceeds a certain maximum number of vertical pixels M (1,088 here), the vertical division is performed. Alternatively, if the total number of pixels in the picture exceeds a certain total number of pixels L (2,228,224=2,048×1,088), the division is performed. As indicated in Table 3, in levels 5, 5.1, and 5.2, the tiles_or_entropy_coding_sync_idc code having a value of three may not be allowed although the tile division is performed. The tile division may be compatible with the allowance of the tiles_or_entropy_coding_sync_idc code having a value of three. This will be described with reference to FIG. 9. FIG. 9 is a flowchart illustrating an exemplary image encoding process. The same step numbers are used in FIG. 9 to identify the steps having the same functions in FIG. 8. A description of such steps is omitted. In Step S904, the parallel processing setting unit 604 determines the number of divided tiles from the profile and the size of the picture supplied from the profile setting unit 603. However, since the number of divided tiles is apparent from the profile and the level or the size of the picture, the number of divided tiles is not encoded.

Constantly performing the tile division allows the number of divided tiles to be determined depending on the level in the parallel profile. Accordingly, the num_tile_columns_minus1 code and the num_tile_rows_minus1 code in the sequence parameter set may be omitted.

Although the case in which the information concerning the division exists in the sequence parameter set is described in the present embodiment, the information concerning the tile division is not limited to the above case. The information concerning the tile division may exist in the picture parameter set, as in an example illustrated in FIG. 11, or may be described in another header. In this case, in Step S804 in FIG. 8, the encoding of the information is performed in the encoding of the picture header.

Although the case in which the tile includes the block lines of an even number is described in the tile division in the present embodiment, Step S812 and the subsequent steps are performed to the last remaining tile and Step S813 and the subsequent steps are not performed when the tile includes the block lines of an odd number.

Third Exemplary Embodiment

The processing components illustrated in FIG. 1, FIG. 2, FIG. 6, and FIG. 7 are realized by hardware in the above embodiments. However, the processes performed in the respective processing components illustrated in these block diagrams may be realized by computer programs.

FIG. 12 is a block diagram illustrating an exemplary hardware configuration of a computer applicable to the image processing apparatuses according to the above embodiments.

Referring to FIG. 12, a CPU 1201 controls the entire computer using computer programs and/or data stored in a random access memory (RAM) 1202 and a read only memory (ROM) 1203 and executes the above processes as the ones performed by the image processing apparatuses according to the above embodiments. In other words, the CPU 1201 functions as the processing components illustrated in FIG. 1, FIG. 2, FIG. 6, and FIG. 7.

The RAM 1202 includes an area where computer programs and/or data loaded from an external storage apparatus 1206, data externally acquired through an interface (I/F) 1207, and so on are temporarily stored. In addition, the RAM 1202 includes a working area used by the CPU 1201 to execute the various processes. Specifically, the RAM 1202 is capable of being allocated as the frame memory or appropriately supplying various other areas.

The ROM 1203 stores setup data for the computer, a boot program, and so on. An operation unit 1204 is composed of, for example, a keyboard and a mouse. A user of the computer operates the operation unit 1204 to give various instructions to the CPU 1201. A display unit 1205 displays the result of the processing by the CPU 1201. The display unit 1205 is composed of, for example, a liquid crystal display.

The external storage apparatus 1206 is a mass information storage apparatus typified by a hard disk drive. An operating system (OS) and the computer programs causing the CPU 1201 to realize the functions of the processing components illustrated in FIG. 1, FIG. 2, FIG. 6, and FIG. 7 are stored in the external storage apparatus 1206. In addition, the image data to be processed may be stored in the external storage apparatus 1206.

The computer programs and the data stored in the external storage apparatus 1206 are appropriately loaded in the RAM 1202 under the control of the CPU 1201 to be processed by the CPU 1201. A network, such as a local area network (LAN) or the Internet, and/or another device, such as a projection device or a display device, may be connected to the I/F 1207. The computer is capable of acquiring and transmitting a variety of information via the I/F 1207. The above components are connected to each other via a bus 1208.

The CPU 1201 mainly controls the operations described above with reference to the flowcharts in the above configuration.

Other Embodiments

Although the picture is directly divided into the tiles in the above embodiments, the division of the picture is not limited to this. When a large screen having a size much larger than a size of 7,680×4,320 is processed, sub-pictures resulting from division may be provided and the sub-pictures may be used as the pictures in the above embodiments. For example, when the image has a size of 15,360×8,640, the image may be divided into four sub-pictures each having a size of 7,680×4,320 and each sub-picture may be divided into four tiles to which the present invention is applied. FIG. 10 illustrates an example of the encoding format of the image in this case. A num_subpic_columns_minus1 code and a num_subpic_rows_minus1 code are added to the sequence parameter set as the codes representing the division of the sub-pictures. The num_subpic_columns_minus1 code and the num_subpic_rows_minus1 code represent the number of horizontally divided sub-pictures and the number of vertically divided sub-pictures, respectively. In addition, the provision of the tiles_or_entropy_coding_sync_idc code and the codes representing the numbers of divided tiles at the header of each sub-picture allows a large picture to be easily supported.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-147142, filed Jun. 29, 2012, which is hereby incorporated by reference herein in its entirety.

The invention claimed is:

1. An image decoding apparatus comprising:
circuitry configured to:
receive encoded image data, information indicating a set profile to represent a combination of processes for image decoding, a first flag indicating whether encoded image data is generated from an input picture as one tile, or a plurality of tiles, and a second flag indicating whether encoded image data is decodable using a sequential process or with a wavefront parallel process; and
decode encoded image data based on the first flag and the second flag, wherein, in a case where the set profile is a first profile, the first flag indicating encoded image data is generated from the input picture as the plurality of tiles and the second flag indicating encoded image data is decodable using the wavefront parallel process are allowed, and
wherein, in a case where the set profile is a second profile, the first flag indicating encoded image data is generated from the input picture as the plurality of tiles and the second flag indicating encoded image data is decodable using the wavefront parallel process are not allowed.

2. The image decoding apparatus according to claim 1, wherein the second flag indicating whether the parallel processing of the decoding processes is enabled if the wavefront parallel processing of the decoding processes in each tile is enabled in the profile and (1) the number of horizontal pixels in the tile exceeds a certain maximum number of horizontal pixels N (N>0), (2) the number of vertical pixels in the tile exceeds a certain maximum number of vertical pixels M (M>0), or (3) the total number of pixels in the tile exceeds a certain total number of pixels L (L>0), in a case where at least one of conditions (1), (2) or (3) is satisfied.

3. An image encoding apparatus comprising:
circuitry configured to:
input a picture;
encode the input picture using one of:
- a first encoding method of generating encoded image data that is decodable using a sequential process, wherein the input picture is not divided into a plurality of tiles,
- a second encoding method of generating encoded image data that is decodable using the sequential process, wherein the input picture is divided into a plurality of rectangular tiles,
- a third encoding method of generating encoded image data that is decodable using a wavefront parallel process, wherein the input picture is not divided into the plurality of tiles, and
- a fourth encoding method of generating encoded image data that is decodable using wavefront parallel process, wherein the input picture is divided into the plurality of rectangular tiles;

set a profile from a plurality of profiles to represent a combination of processes for image encoding;
wherein, in a case where a first profile is set,
- the encoding method is selected from first encoding method, second encoding method, third encoding method, and fourth encoding method and
- generate a first flag indicating whether encoded image data is generated from the input picture as one tile, or the plurality of tiles, and a second flag indicating whether encoded image data is decodable using the sequential process or with the wavefront parallel process,
- set the first flag indicating encoded image data is generated from the input picture as the plurality of tiles and
- set the second flag indicating encoded image data is decodable using the wavefront parallel process, and in a case where a second profile is set,
- the encoding method is selected from first encoding method, second encoding method, and third encoding method and
- both the first flag indicating encoded image data is generated from a picture as the plurality of tiles and the second flag indicating encoded image data is able to be decoded with a parallel process are not allowed to be generated.

4. An image decoding method comprising steps of:
receiving encoded image data, information indicating a set profile to represent a combination of processes for image decoding, a first flag indicating whether encoded image data is generated from a picture as one tile, or a plurality of rectangular tiles, and a second flag indicating whether encoded image data is decodable using a sequential process or with a wavefront parallel process; and
decoding encoded image data based on the first flag and the second flag,
wherein, in a case where the set profile is a first profile, both the first flag indicating encoded image data is generated from an input picture as the plurality of rectangular tiles and the second flag indicating encoded image data is decodable using the wavefront parallel process are allowed, and
wherein, in a case where the set profile is a second profile, both the first flag indicating encoded image data is generated from a picture as the plurality of rectangular tiles and the second flag indicating encoded image data is able to be decoded with the wavefront parallel process are not allowed.

5. An image encoding method in an image encoding apparatus, the image encoding method comprising:
a receiving step of receiving an input picture;
a dividing step of dividing the input picture into a plurality of rectangular tiles;
an encoding step of encoding the received input picture using one of:
- a first encoding method of generating encoded image data that is decodable using a sequential process, wherein the input picture is not divided into a plurality of tiles,
- a second encoding method of generating encoded image data that is decodable using the sequential process, wherein the input picture is divided into a plurality of rectangular tiles,
- a third encoding method of generating encoded image data that is decodable using the wavefront parallel process, wherein the input picture is not divided into the plurality of tiles, and
- a fourth encoding method of generating encoded image data that is decodable using the wavefront parallel process, wherein the input picture is divided into the plurality of rectangular tiles;

a setting step of setting a profile from a plurality of profiles to represent a combination of processes for image encoding;
a flag generating step of generating a first flag indicating whether encoded image data is generated from a picture as one tile, or the plurality of rectangular tiles, and a second flag indicating whether encoded image data is decodable using the sequential process or with the wavefront parallel process,
a controlling step of
selecting, in a case where a first profile is set,
- the encoding method from first encoding method, second encoding method, third encoding method, and fourth encoding method and
- generating both the first flag indicating encoded image data is generated from the input picture as the plurality of rectangular tiles and the second flag indicating encoded image data is decodable using the wavefront parallel process, and selecting, in a case where a second profile is set, the encoding method from first encoding method, second encoding method, and third encoding method and
not allowing both the first flag indicating encoded image data is generated from the input picture as the plurality of rectangular tiles and the second flag indicating encoded image data is decodable using the wavefront parallel process to be generated.

6. A non-transitory computer-readable recording medium storing a program that causes a computer to function as the image decoding apparatus according to claim 1.

7. A non-transitory computer-readable recording medium storing a program that causes a computer to function as the image encoding apparatus according to claim 3.

8. The image encoding apparatus according to claim 3, wherein the control unit performs the control so as to select the first encoding method if the wavefront parallel processing of the decoding processes in each tile is enabled in the first profile and (1) the number of horizontal pixels in the tile exceeds a certain maximum number of horizontal pixels N (N>0), (2) the number of vertical pixels in the tile exceeds a certain maximum number of vertical pixels M (M>0), or (3) the total number of pixels in the tile exceeds a certain total number of pixels L (L>0), in a case where at least one of conditions (1), (2) or (3) is satisfied.

* * * * *